US010270900B2

(12) United States Patent
Zeng et al.

(10) Patent No.: US 10,270,900 B2
(45) Date of Patent: Apr. 23, 2019

(54) DATA PROCESSING METHOD AND APPARATUS

(71) Applicant: Alibaba Group Holding Limited, Grand Cayman (KY)

(72) Inventors: Zhonghua Zeng, Hangzhou (CN); Lihong Li, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/668,589

(22) Filed: Aug. 3, 2017

(65) Prior Publication Data

US 2017/0331941 A1 Nov. 16, 2017

Related U.S. Application Data

(63) Continuation of application No. PCT/CN2016/072768, filed on Jan. 29, 2016.

(30) Foreign Application Priority Data

Feb. 4, 2015 (CN) .......................... 2015 1 0058630

(51) Int. Cl.
*H04M 1/00* (2006.01)
*H04M 1/725* (2006.01)
(52) U.S. Cl.
CPC ... *H04M 1/72569* (2013.01); *H04M 1/72566* (2013.01); *H04M 1/72547* (2013.01); *H04M 2250/22* (2013.01)
(58) Field of Classification Search
CPC ........... H04M 1/7253; H04M 1/72569; H04M 15/00; H04M 15/41; H04M 15/47;

(Continued)

(56) References Cited

U.S. PATENT DOCUMENTS

2006/0203620 A1* 9/2006 Bedingfield, Sr. ... G06Q 10/109
368/247
2013/0275899 A1* 10/2013 Schubert ............... G06F 3/0481
715/765

(Continued)

FOREIGN PATENT DOCUMENTS

CN 102137333 7/2011
CN 102413228 4/2012
CN 103873673 6/2014

OTHER PUBLICATIONS

Translation of International Search Report from corresponding PCT application No. PCT/CN2016/072768 dated Apr. 28, 2016, 2 pages.

(Continued)

*Primary Examiner* — Ajibola A Akinyemi
(74) *Attorney, Agent, or Firm* — Lee & Hayes, P.C.

(57) ABSTRACT

A method and an apparatus of data processing are disclosed. The method includes obtaining a message including a non-triggered event; determining an event type and a triggering time of the non-triggered event according to the message; and providing a reminder for the non-triggered event according to the event type and the triggering time, and/or controlling a state of the mobile terminal according to the event type and the triggering time. By determining a triggering time and an event type of a non-triggered event, a prompt may also be made before the triggering time even if a user has read the information. Alternatively, the user may also be helped to adjust the state of the mobile terminal to a state related to the event type, so that the mobile terminal is in a state required by the user during the execution of the non-triggered event, thus improving the user experience.

20 Claims, 14 Drawing Sheets

(58) Field of Classification Search
CPC .... H04M 15/73; H04M 15/80; H04M 1/6075; H04M 1/6091; H04M 1/72525; H04M 1/72547; H04M 1/72577
USPC ........................................................ 455/566
See application file for complete search history.

(56) References Cited

U.S. PATENT DOCUMENTS

| | | | | |
|---|---|---|---|---|
| 2013/0311294 A1* | 11/2013 | Ward | ................ | G06Q 30/0267 705/14.64 |
| 2014/0165112 A1* | 6/2014 | Freeman | ............ | H04N 21/4122 725/81 |
| 2016/0105642 A1* | 4/2016 | Nagase | ................ | H04M 1/575 348/14.08 |

OTHER PUBLICATIONS

Translation of Written Opinion from corresponding PCT application No. PCT/CN2016/072768 dated Apr. 28, 2016, 6 pages.

* cited by examiner

DATA PROCESSING METHOD AND APPARATUS

CROSS REFERENCE TO RELATED PATENT APPLICATIONS

This application claims priority to and is a continuation of PCT Patent Application No. PCT/CN2016/072768 filed on 29 Jan. 2016, and is related to and claims priority to Chinese Patent Application No. 20150058630.9, filed on Feb. 4, 2015, entitled "Data Processing Method and Apparatus," which is hereby incorporated by reference in its entirety.

TECHNICAL FIELD

The present disclosure relates to the field of data processing, and in particular, to data processing methods and apparatuses.

BACKGROUND

A mobile terminal has a function of obtaining information, such as obtaining push information from a server, information from contacts of an address book, or the like. A mobile terminal may send or receive messages in a variety of different manners, for example, in a texting manner or through various clients, such as E-mail, QQ, and WeChat.

Messages received by a user through his/her terminal are diversified in nature. Most of the messages include certain important information. For example, a message that notifies participation in a meeting may include information such as a meeting time, place, etc. An e-ticket message sent after a movie ticket is purchased may include an electronic redeem code needed for watching a movie, a starting time and a place of the movie, etc. These types of messages that include important information are increasing in number, and message sources tend to be diversified. Therefore, messages to which the user needs to pay attention are also increasing accordingly.

At present, after receiving a new message, a user may open and read the message to understand content of the message. A terminal is only responsible for receiving the message and displaying the message to the user based on the user's operation of viewing the message, and fails to provide functions of additional processing of the message. The terminal has simple functionalities of processing the message, and the processing capability of the mobile terminal is not well utilized. Accordingly, a message that includes important information requires a user to actively pay attention by memorization. Such a manner is very inconvenient to the user. If the user fails to timely read the message or forgets the content of the message, this may lead to various problems, for example, a delay of an important event. Accordingly, an urgent need of existing technologies is to provide a solution of further processing a received message based on a mobile terminal.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

In order to solve the above technical problems, the present disclosure provides a method and an apparatus of data processing, to process a message received by a mobile terminal in a further manner, thus effectively utilizing the processing capabilities of the mobile terminal.

Embodiments of the present disclosure disclose the following technical solutions.

A data processing method, which is applied to a mobile terminal, includes obtaining a message including a non-triggered event; determining an event type and a triggering time of the non-triggered event according to the message; and providing a reminder for the non-triggered event according to the event type and the triggering time, and/or controlling a state of the mobile terminal according to the event type and the triggering time.

In implementations, providing the reminder for the non-triggered event according to the event type and the triggering time includes determining a prompt time according to the event type and the triggering time, the prompt time being earlier than the triggering time; and displaying first content of the non-triggered event on a lock screen interface when the mobile terminal displays the lock screen interface at a time between the prompt time and the triggering time.

In implementations, after the displaying the first content of the non-triggered event on the lock screen interface, the method further includes detecting an operation of triggering to view the non-triggered event on the lock screen interface; and displaying second content of the non-triggered event according to the detected operation, the second content being not less than the first content.

In implementations, the operation of triggering to view the non-triggered event includes an operation of clicking the first content, or an operation of sliding on the lock screen interface.

In implementations, when the operation of triggering to view the non-triggered event is the operation of sliding on the lock screen interface, a starting point of the sliding is within an area where the first content is located.

In implementations, when the operation of triggering to view the non-triggered event is the operation of sliding on the lock screen interface, displaying the second content of the non-triggered event includes determining a display area of the second content on the lock screen interface according to an end position of the sliding, and displaying the second content of the non-triggered event in the display area.

In implementations, displaying the first content of the non-triggered event includes obtaining the first content from feature data in the message related to the non-triggered event according to a display field included in a first style template, and displaying the first content according to a display style included in the first style template.

Displaying the second content of the non-triggered event includes obtaining the second content from the feature data in the message related to the non-triggered event according to a display field included in a second style template, and displaying the second content according to a display style included in the second style template.

In implementations, the first style template and the second style template individually correspond to the event type of the non-triggered event.

In implementations, the display field included in the first style template includes at least a name field and a triggering time field of the non-triggered event.

In implementations, displaying the first content of the non-triggered event further includes establishing a first set display field and a hyperlink of a corresponding application included in the first content. Additionally or alternatively, displaying the second content of the non-triggered event further includes establishing a second set display field and a hyperlink of a corresponding application included in the second content.

In implementations, the method further includes receiving an operation of selecting a display field of displayed content by a user; and executing an application corresponding to the selected display field if the selected display field has a hyperlink.

In implementations, controlling the state of the mobile terminal according to the event type and the triggering time includes controlling an adjustment of a profile of the mobile terminal into a profile corresponding to the event type at a set time when or before the triggering time is reached.

In implementations, before controlling the adjustment of the profile of the mobile terminal into the profile corresponding to the event type, the method further includes determining that the user is in a ready state of executing the non-triggered event.

In implementations, determining that the user is in the ready state of executing the non-triggered event includes determining a triggering position of the non-triggered event according to the message, locating a position of the user, and determining that the user is in the ready state of executing the non-triggered event if the position of the user matches the triggering position of the non-triggered event; or determining that the user has viewed the message or responded to the reminder of the non-triggered event before the triggering time.

In implementations, before controlling the adjustment of the profile of the mobile terminal into the profile corresponding to the event type, the method further includes sending a prompt of adjusting the profile to the user; and receiving an instruction indicating an acknowledgement of adjusting the profile from the user.

In implementations, the method further includes restoring the profile of the mobile terminal in response to detecting that the execution of the non-triggered event is completed.

In implementations, before restoring the profile of the mobile terminal, the method further includes sending a prompt of restoring the profile to the user; and receiving an instruction indicating an acknowledgement of restoring the profile from the user.

A data processing apparatus, which is applied to a mobile terminal, includes an acquisition unit configured to obtain a message including a non-triggered event; a determination unit configured to determine an event type and a triggering time of the non-triggered event according to the message; and a processing unit configured to provide a reminder of the non-triggered event according to the event type and the triggering time, and/or control a state of the mobile terminal according to the event type and the triggering time.

In implementations, the processing unit further includes a first determination sub-unit configured to determine a prompt time according to the event type and the triggering time, the prompt time being earlier than the triggering time; and a prompt sub-unit configured to display first content of the non-triggered event on a lock screen interface when the mobile terminal displays the lock screen interface at a time between the prompt time and the triggering time.

In implementations, the processing unit further includes a detection sub-unit configured to detect an operation of triggering to view the non-triggered event on the lock screen interface after the prompt sub-unit is triggered, and the prompt sub-unit is further configured to display second content of the non-triggered event according to the detected operation, the second content being not less than the first content.

In implementations, the operation of triggering to view the non-triggered event includes an operation of clicking the first content; or an operation of sliding on the lock screen interface.

In implementations, when the operation of triggering to view the non-triggered event is the operation of sliding on the lock screen interface, a starting point of the sliding is within an area where the first content is located.

In implementations, when the operation for triggering to view the non-triggered event is the operation of sliding on the lock screen interface, the second content of the non-triggered event is displayed, and the prompt sub-unit is specifically configured to determine a display area of the second content on the lock screen interface according to an end position of the sliding, and display the second content of the non-triggered event in the display area.

In implementations, displaying the first content of the non-triggered event by the prompt sub-unit specifically includes obtaining the first content from feature data in the message related to the non-triggered event according to a display field included in a first style template, and displaying the first content according to a display style included in the first style template. Displaying a second content of the non-triggered event by the prompt sub-unit specifically includes obtaining the second content from feature data in the message related to the non-triggered event, according to a display field included in a second style template, and displaying the second content according to a display style included in the second style template.

In implementations, the first style template and the second style template individually correspond to the event type of the non-triggered event.

In implementations, the display field included in the first style template includes at least a name field and a triggering time field of the non-triggered event.

In implementations, displaying a first content of the non-triggered event by the prompt sub-unit further specifically includes establishing a first set display field and a hyperlink of a corresponding application included in the first content. Additionally or alternatively, displaying a second content of the non-triggered event by the prompt sub-unit further specifically includes establishing a hyperlink of a second set display field and a corresponding application included in the second content.

In implementations, the processing apparatus further includes a first receiving sub-unit configured to receive an operation of selecting a display field of displayed content by a user; and a display sub-unit configured to execute an application corresponding to the selected display field if the selected display field has a hyperlink.

In implementations, the processing unit further includes an adjusting sub-unit configured to control a profile of the mobile terminal to be adjusted to a profile corresponding to the event type at a set time when or before the triggering time is reached.

In implementations, the processing unit further includes a second determination sub-unit configured to determine that a user is in a ready state of executing the non-triggered event before the adjusting sub-unit is triggered.

In implementations, the second determination sub-unit is specifically configured to determine a triggering position of the non-triggered event according to the message, locate a position of the user, and determine that the user is in the ready state of executing the non-triggered event if the position of the user matches the triggering position of the non-triggered event. Alternatively, the second determination sub-unit is specifically configured to determine that the user has viewed the message or responded to the reminder of the non-triggered event before the triggering time.

In implementations, the processing unit further includes a third acknowledgement sub-unit configured to send a prompt of adjusting the profile to the user before the adjusting sub-unit is triggered; and receive an instruction of acknowledgement of adjusting the profile by the user.

In implementations, the apparatus further includes a restoring unit configured to restore the profile of the mobile terminal in response to detecting that an execution of the non-triggered event is completed.

In implementations, the apparatus further includes an acknowledgement unit configured to send a prompt of restoring the profile to the user before the restoring unit is triggered, and receive an instruction of acknowledgement of restoring the profile by the user.

As can be seen from the above technical solutions, when a message including a non-triggered event is obtained, a prompt may be made for the non-triggered event before a triggering time through a reminding manner corresponding to an event type even if a user has read the message, by analyzing the message to determine the triggering time and the event type of the non-triggered event, thus playing a role of further prompting the user of the non-triggered event. Alternatively, the user may also be helped to adjust a state of a mobile terminal to a state related to the event type, so that the mobile terminal is in a state required by the user while the non-triggered event is executed, thus improving user experience.

BRIEF DESCRIPTION OF THE DRAWINGS

In order to describe the technical solutions in the embodiments of the present disclosure or in the existing technologies more clearly, accompanying drawings used for describing the embodiments or the existing technologies are introduced briefly herein. Apparently, the accompanying drawings in the following description represent merely some embodiments of the present disclosure. One of ordinary skill in the art may also obtain other accompanying drawings based on these accompanying drawings without making any creative effort.

DETAILED DESCRIPTION

Figure 1:
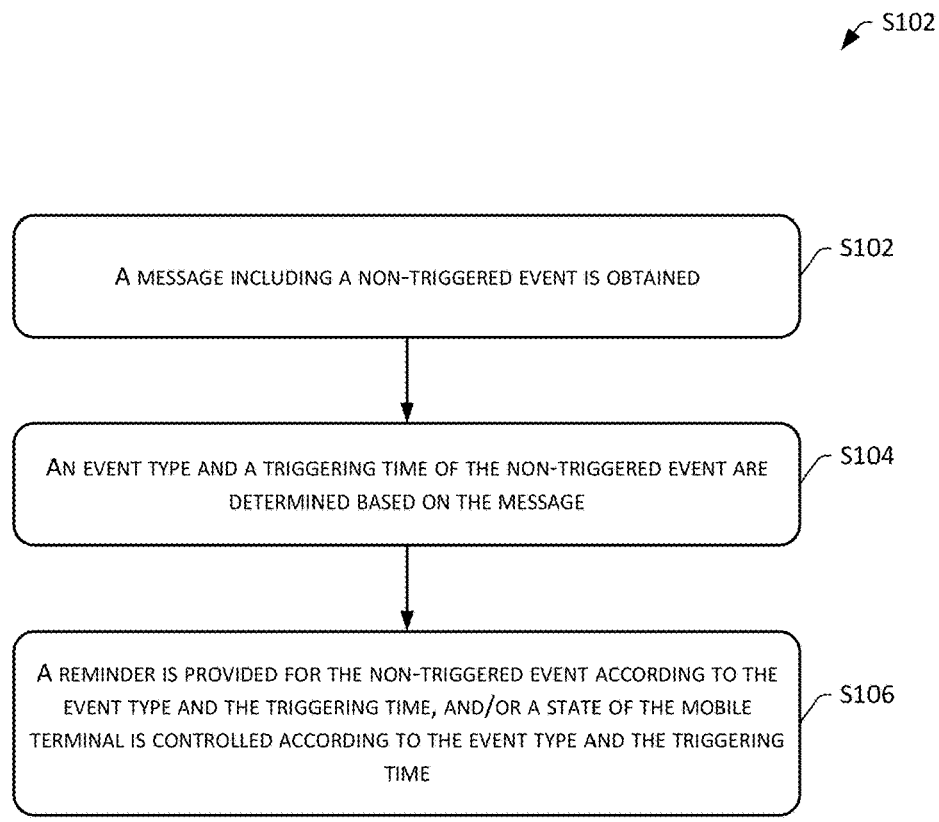
FIG. 1 is a flowchart of a data processing method according to an embodiment of the present disclosure.

At present, after receiving a new message, a user may generally open and read the message to understand the content of the message. A terminal is only responsible for receiving the message and displaying the message to the user based on the user's operation of viewing the message, and fails to provide functionalities for further processing the message. As can be seen, the terminal has a simple functionality of processing the message, and the processing capabilities of the mobile terminal are not well utilized. However, the technical solutions provided in the embodiments of the present disclosure can effectively utilize the processing resources of a mobile terminal for further processing a message. For example, if the message includes a non-triggered event, the terminal is capable of prompting a user of the non-triggered event, or is capable of controlling a state of the terminal according to the non-triggered event, after the user reads the message.

In the existing technologies, a prompt for a message is mainly to prompt a user that there is a new message through voice or lightening a screen when the new message is received, and it is possible to display a new message notification or a new message preview on a lock screen interface. In the existing technologies, content of a message may be displayed on a lock screen interface, but a prompt time is the time when a user receives the message, i.e., the message is an unread message. Once the user finishes reading the message, the system will no longer provide any subsequent prompts to the user for the message. However, under many circumstances, a message, such as e-coupon information obtained after a purchase of a movie ticket, a plane ticket push message obtained from an airline company after a purchase of a plane ticket, etc., may include a non-triggered event. After the user has read such message, it is likely that the user may forget the event if there is still a period of time before the event in such message is triggered. If the user cannot arrive at designated position (e.g., a cinema, an airport or the like) of the event before a predetermined triggering time, the event cannot be completed, resulting in a loss of the user. Thus, a system has a requirement for continuously prompting a user subsequently for a non-triggered event included in a message. Therefore, according to an aspect of the embodiments of the present disclosure, a method and an apparatus of data processing are provided, which can parse and analyze various types of short messages that are received, parse out non-triggered events therefrom, and further process the non-triggered events. Specifically, when a message including a non-triggered event is obtained, a triggering time and an event type of the non-triggered event are determined by analyzing the message. Even if the user has read the information, a prompt may also be made for the non-triggered event before the triggering time through a manner of prompting corresponding to the event type, thus playing a role of further prompting the user of the non-triggered event.

It should be further noted that, if a non-triggered event included in a message requires a mobile terminal to be in a particular state during execution, for example, if the non-triggered event is about participation in a meeting, watching a movie or the like, the mobile terminal generally needs to be in a silent mode, to avoid the atmosphere of the meeting from being disturbed or a film watching condition from being affected due to receiving of information or ringing of a call during the participation in the meeting or watching of the movie. If the non-triggered event is about taking a plane, the mobile terminal needs to be adjusted to an airplane mode or needs to be powered off directly, to avoid that signals of the mobile terminal affects receiving and sending of signals of the plane to cause serious consequences. However, in the above situations, a state of a mobile terminal can be actively controlled only when a user remembers to do so under existing technologies. If the user forgets to adjust the mobile terminal to a suitable state, negative effects may be resulted for the user, thus bringing about bad user experience. Accordingly, according to another aspect of the embodiments of the present disclosure, a method and an apparatus of data processing are provided, which can parse a variety of different types of short messages that are received, parse and analyze non-triggered events therefrom, and further process the non-triggered events. Specifically, when a message including a non-triggered event is obtained, a triggering time and an event type of the non-triggered event are determined by analyzing the message. Even if the user has read the information, the user may also be helped to adjust a state of a mobile terminal to a state related to the event type, so that the mobile terminal is in a state required by the user when the non-triggered event is executed, thus improving the user experience.

To make the objectives, technical solutions, and advantages of the embodiments of the present disclosure more clear, the technical solutions in the embodiments of the present disclosure are clearly described herein with reference to the accompanying drawings in the embodiments of the present disclosure. Apparently, the described embodiments represent merely some and not all of the embodiments of the present disclosure. All other embodiments obtained by one of ordinary skill in the art based on the embodiments in the present disclosure without making any creative effort belong to the scope of protection of the present disclosure.

First Embodiment

FIG. 1 is a flowchart of a data processing method 100 according to an embodiment of the present disclosure, which is applicable to a mobile terminal. The method 100 may include the following operations.

S102: A message including a non-triggered event is obtained.

For example, the non-triggered event may be understood as an event that has not yet taken place currently and is going to take place at a determined future time point, such as watching a movie B in a cinema A at nine o'clock tomorrow morning, taking a flight D at an airport C at five o'clock in the afternoon on the third day of next month, etc. The message may include the non-triggered event and related feature data.

S104: An event type and a triggering time of the non-triggered event are determined based on the message.

For example, the non-triggered event has related feature data. The feature data may be understood as the time when the non-triggered event takes place, specific content of the non-triggered event, etc. For example, after a user purchases two movie tickets through www.wangpiao.com and pays for the tickets online, a mobile terminal of the user receives a message related to the online purchase of the movie tickets sent by www.wangpiao.com. A non-triggered event included in the message may be understood as watching a movie. Feature data related to the event may include the following content:

Sender: "partnerName": "www.wangpiao.com";
Seat Information: "seatCount": "2", "hall": "Hall 2", "Serial No.": "110455400", "seatInfo": "Row 8, Seat 06|Row 8, Seat 07";
Cinema Information: "cinemaName": "China Film International Cinema—Hangzhou Xixi In City Plaza Store";
Time: "showTime": "20:15:00", "showDate": "2015\/02\/14",
Contact: "cinemaPhone": "0517-88680672";
Tips: "tip": "1. Place for picking up the tickets: cinema (seller's ticket vending machine or cinema reception, subject to the short message). <br\/>2. Method of picking up the tickets: input redeemed information as prompted at the seller's ticket vending machine or the cinema reception, to pick up the tickets. <br\/>3. If there is any doubt about ticket pick-up, please dial a seller's telephone for information. <br\/>4. Owing to the particularity of a seat-selected ticket, after the ticket is successfully taken, the seat cannot be modified and refund is forbidden. Please notice the showing number and time of the ticket, and watch the movie timely, to avoid a waste";
Movie Information: "version": "Chinese 2D", "duration": "113", "showName": "Don't Go Breaking My Heart II";
Counseling Phone: "partnerPhone": "400-678-2005";
Poster: "poster": "http: \/\/img1.tbcdn.cn\/bao\/uploaded\/Vi1\/TB1fy51GF_.jpg";
Cinema Address: "cinemaAddress": "3$^{rd}$ Floor, Xixi in City Plaza, No. 1, Wuchang Avenue", "check-in code": "354042".

As can be determined from the above feature data, the event type of the event is watching a movie, and the triggering time is 20:15 on Feb. 14, 2015.

Specifically, a feature field to be extracted from a message may be defined in advance, and content of the message may be parsed and analyzed to determine a piece of content that matches the feature field. The feature field includes at least a time field and a field for determining an event type. For example, an event type determined from a feature field "movie" may be "watch a movie", an event type determined from a feature field "flight number" may be "take a flight", etc. The field for determining an event type may be specifically defined according to an actual situation, which is not listed one by one herein.

Event types in the embodiment of the present disclosure are not limited to watching a movie and taking a flight, and may further include ordering a meal, taking a train, etc.

Messages in the embodiment of the present disclosure include various types of message sources, such as short messages, instant messaging information, third-party application push information, etc.

S106: A reminder is provided for the non-triggered event according to the event type and the triggering time, and/or a state of the mobile terminal is controlled according to the event type and the triggering time.

For example, according to the technical solutions provided in the embodiment of the present application, various types of short messages that are received may be parsed and analyzed to determine a non-triggered event therefrom, and the non-triggered event is further processed. The processing includes, but is not limited to, providing a reminder for the non-triggered event in one aspect, and controlling a state of the mobile terminal according to the non-triggered event in another aspect. For the above two aspects of processing, one or both thereof may be selected for execution.

Providing the reminder for the non-triggered event may include displaying prompt information on a lock screen interface, and may also include making a prompt through a sound, etc. Controlling a state of the mobile terminal may include setting a profile of the mobile terminal as a profile corresponding to the non-triggered event, and may also include setting the mobile terminal in a specific state, for example, a flight mode or the like.

As can be seen, when a message including a non-triggered event is obtained, by analyzing the message to determine a triggering time and an event type of the non-triggered event, even if a user has read the information, a prompt may also be made for the non-triggered event before the triggering time through a manner of prompting corresponding to the event type, thus playing a role of further prompting the user of the non-triggered event. Alternatively, the user may also be helped to adjust a state of a mobile terminal to a state related to the event type, so that the mobile terminal is in a state required by the user during an execution of the non-triggered event, thus improving the user experience.

The above two aspects of processing are described respectively in detail through a second embodiment and a third embodiment hereinafter.

Second Embodiment

Based on top of the first embodiment, the present embodiment describes a situation of providing a reminder for a non-triggered event according to an event type and a triggering time.

In implementations, providing the reminder for the non-triggered event according to the event type and the triggering time includes determining a prompt time according to the event type and the triggering time, the prompt time being earlier than the triggering time; and displaying first content of the non-triggered event on a lock screen interface when the mobile terminal displays the lock screen interface at a time between the prompt time and the triggering time.

For example, the prompt time may be understood as a time point which is at a preset time earlier than the triggering time. Different preset times may be assigned according to different event types. For example, for an event of a type of watching a movie, a preset time corresponding thereto doesn't necessarily have to be large, and may be set as 40 minutes, for example. If a triggering time for an event of watching a movie of which is 20:15 on Feb. 14, 2015, a prompt time so determined may be 19:35 on Feb. 14, 2015.

For an event of a type of taking a flight, a preset time corresponding thereto needs to be relatively large, which may be set as 4 hours. For example, for an event of a type of taking a flight of which a triggering time is 20:15 on Feb. 14, 2015, a prompt time so determined may be 16:15 on Feb. 14, 2015.

It should be understood that the above manner of setting a prompt time is merely an example. In a real application, the time may be inputted by a user according to his/her own need, and may also be determined according to a distance from a location of the user with respect to an event triggering place. If the distance is long, the prompt is made earlier, and the time may also be set by the system. There is no need to enumerate all the manners herein.

For example, in order to display the first content more clearly, a display field in a preset style template may be used to display the first content. In implementations, displaying the first content of the non-triggered event includes obtaining the first content from feature data in the message related to the non-triggered event according to a display field included in a first style template, and displaying the first content according to a display style included in the first style template. The display style may be understood to include a layout formed by a combination of one or more of a display area, a background of display content, and a display field. If the displayed content includes a text, the style template may further include a font and a color of the text. If the displayed content includes a picture, the style template may further include a format, a size, an area, etc., of the picture. If the displayed content includes animation, the style template may further include a format, a size, an area and the like of the animation. Through a display form of a picture and/or animation, a more intuitive prompt effect may be produced.

Figure 2A:
FIG. 2A is a schematic diagram of displaying first content on a lock screen interface according to an embodiment of the present disclosure.

When the first content is displayed through the first style template, the first content may be displayed in a display area on the lock screen interface. A display form of the first content may be as shown in FIG. 2A. FIG. 2A is a schematic diagram of displaying first content on a lock screen interface according to an embodiment of the present disclosure. The first content displays a movie name, a cinema name, and a time interval between a current time and a triggering time.

In FIG. 2A, a position of the first content on the lock screen interface is only an exemplary position, and the embodiments of the present disclosure do not have any limitation on the specific position of the first content displayed on the lock screen interface.

The first content displayed in FIG. 2A is one type of coupon forms, i.e., a small coupon. In order to clearly determine the content to be displayed, feature data related to an event in a message may be classified through a model. An exemplary method of classification may be as shown as follows:

[card_id]: TEXT
[service_id]: TEXT
[type]: TEXT
[ownerid]: TEXT
[title]: TEXT
[logourl]: TEXT
[content]: TEXT
[location]: TEXT
[status]: TEXT DEFAULT '1'
[biz_status]: INTEGER DEFAULT '1'
[sync_status]: TEXT
[occurtime]: INTEGER
[gmt_create]: INTEGER
[other_ext]: TEXT
[arg0]: INTEGER
[arg1]: TEXT
[arg2]: TEXT TEXT is textual content, and INTEGER is integer content. A service field includes a content field and a biz_status field, and arg0 to arg2 are extension fields. The remaining ones are basic fields. occurtime is a triggering time of an event, and gmt_create is an event creation time. card_id is a unique identification of a coupon of an event. Each coupon has a service_id, indicating an event type of a corresponding event. Display layers of coupons having an identical service_id may be the same. ownerid is a user attribute of a coupon. Title is the title when the coupon is displayed. Content is a service field of which a specific format is a json, and is defined by a business party. biz_status is a service status.

By taking an event of watching a movie of which a triggering time is 20:15 on Feb. 14, 2015 as an example, coupon data may be obtained by analyzing corresponding feature data in the message. The coupon data may be as shown in Table 1:

TABLE 1

| | |
|---|---|
| card_id | D221S24GX3NMJYIJHXCM |
| service_id | CXA8B16D6GRJFQ3H2IEK |
| ownerid | 544907768684xxxx |
| title | Don't Go Breaking My Heart II |
| logourl | http:\/\/img1.tbcdn.cn\/bao\/uploaded\/\/i1\/TB1fy5IGF_.jpg |
| content | {"partnerName": "www.wangpiao.com", "seatCount": "2", "hall": "Hall 2", "Serial No.": "110455400", "seatInfo": "Row 8, Seat 06 \| Row 8, Seat 07", "cinemaName": "China Film International Cinema - Hangzhou Xixi In City Plaza Store", "showTime": "20:15:00", "showDate": "2015\/02\/14", "cinemaPhone": "0517-88680672", "tip": "1. Ticket taking place: cinema (seller's ticket vending machine or cinema reception, subject to the short message). <br\/>2. Ticket taking manner: input redeem information as prompted at the seller's ticket vending machine or cinema reception, and then the ticket can be taken. <br\/>3. If there is any doubt about ticket taking, please dial a seller telephone for counseling. <br\/>4. Owing to particularity of a seat-selected ticket, after the ticket is successfully taken, the seat cannot be modified and refund is forbidden. Please notice the showing number and time of the ticket, and watch the movie timely, to avoid a waste.", "version": "Chinese 2D", "duration": "113", "showName": "Don't Go Breaking My Heart II", "partnerPhone": "400-678-2005", "poster": "http:\/\/img1.tbcdn.cn\/bao\/uploaded\/\/i1\/TB1fy5IGF_.jpg", "cinemaAddress": "3$^{rd}$ Floor, Xixi In City Plaza, No. 1, Wuchang Avenue", "check-in code": "354042"} |
| occurtime | 1415967300000 |
| gmt_create | 1415888756000 |

A character string in the service_id may be used to represent a different event type. For example, the event type is indicated as a type of watching a movie through CXA8B16D6GRJFQ3H2IEK in Table 1. occurtime and gmt_create may be expressed in a form of an absolute time, and this is a usual manner of expressing an absolute time in program processing, which indicates the number of milliseconds since 00:00:00 on Jan. 1, 1970 to with respect to the time to be expressed, for example, the way of expression in Table 1.

The way of providing the prompt on the lock screen interface may include actively calling a corresponding interface by a lock screen program in the system of the mobile terminal when the time reaches the prompt time and the lock screen interface is displayed to obtain saved coupon data. For example, coupon data of the event is obtained based on content://com.yunos.lifecard/keyguard, and the first content is displayed on the lock screen interface.

Alternatively, a coupon prompt program in the system of the mobile terminal determines whether the current time is between the prompt time and the triggering time, and the first content is displayed on the lock screen interface if the lock screen interface is displayed and the current time is between the prompt time and the triggering time.

In implementations, the first style template corresponds to the event type of the non-triggered event, so that the form and style of the first content may change according to a different event type of the event, but may not be limited to the form and style as shown in FIG. 2A.

In implementations, the display field included in the first style template includes at least a name field and a triggering time field of the non-triggered event. The first content may be all or some of the content in Table 1. Under normal circumstances, the first content may be a summary of the content corresponding to the event, and the first content may put emphasis on displaying key information of the non-triggered event, for example, the event name, the triggering time, and so on, to achieve an effect of making the clearest prompt in the smallest area.

In implementations, displaying the first content of the non-triggered event further includes establishing a first set display field and a hyperlink of a corresponding application included in the first content.

In implementations, an operation of selecting a display field of displayed content is received from a user.

If the selected display field has a hyperlink, an application corresponding to the selected display field is executed.

For example, when the first content is displayed through the first style template, a corresponding hyperlink may be established for some specific fields included in the first content, and a corresponding application may be executed when the hyperlink is selected. The first set display field may be a telephone number, a geographical position, time, weather, or the like. For example, when the first set display field is a telephone number, a hyperlink to an application of making a phone may be established. When a user clicks the displayed telephone number or a call identification beside the telephone number, the hyperlink may be executed to open the application: calling the telephone number. When the first set display field is weather, a hyperlink to an application of weather forecast may be established. When the user clicks the displayed time or a weather identification beside the time, the hyperlink may be executed to open the application: weather forecast. By establishing hyperlinks between different fields and applications, a corresponding application service may be quickly provided to the user, to facilitation the operations of the user.

It should be further noted that, when multiple messages having different non-triggered events are obtained, a situation that a plurality of non-triggered events need to be prompted may occur at a time point if intervals between prompt times and triggering times of the multiple non-triggered events overlap with each other. Accordingly, the embodiments of the present disclosure may display a plurality of pieces of first content corresponding to a number of different non-triggered events respectively on the lock screen interface through a simultaneous display manner, or may also display, through a polling display manner, only a piece of first content or a number of pieces of first content corresponding to one or more of the non-triggered events each time when the lock screen interface is displayed. The display manner is not limited in the present disclosure.

As can be seen, when a message including a non-triggered event is obtained, by analyzing the message to determine a triggering time and an event type of the non-triggered event, a prompt may also be made for the non-triggered event before the triggering time through a manner of prompting corresponding to the event type, even if a user has read the information, thus playing a role of further prompting the user the non-triggered event.

Other than the manner of displaying first content of a non-triggered event on a lock screen interface as described in the above embodiment, it should be understood that other display methods may be used in the embodiments of the present disclosure to provide a reminder for the non-triggered event. For example, the first content may be displayed in a notification bar of a user, or displayed on an interface currently operated by the user. In other words, the embodiments of the present disclosure do not limit a display position of first content of a non-triggered event, and the first content may be displayed in an operation scenario and interface of any terminal to prompt a user, which is not detailed herein.

Third Embodiment

On the basis of the first embodiment, the present embodiment further describes a situation of controlling a state of a mobile terminal according to an event type and a triggering time.

In implementations, controlling the state of the mobile terminal according to the event type and the triggering time includes controlling a profile of the mobile terminal to be adjusted to a profile corresponding to the event type at a set time that is at or prior to the triggering time.

For example, the profile may be understood as a profile currently supported by the mobile terminal, for example, a flight mode, a silent mode, a vibration mode, a ringing mode, or the like, and may also be understood as a profile customized according to requirements of the embodiment of the present disclosure. The customization may be selected and defined by a user, for example, a hybrid mode of vibration and ringing, a mode of refusing to answer a call but receiving data information, or the like. For different event types, different profiles may exist correspondingly. Furthermore, different customized profiles may exist for a same event type, for example. For example, a non-triggered event is specifically holding a departmental meeting from three o'clock to five o'clock in the afternoon on Feb. 13, 2015, and a corresponding event type may be a meeting event. A profile corresponding to the meeting event may be a silent mode. From three o'clock in the afternoon of that day on which the departmental meeting is held, a current profile of the mobile terminal is adjusted to a corresponding silent mode. Thus, when the departmental meeting is held, the mobile terminal may not affect the discipline of the meeting due to creating noises by receiving a call, a text message, and so on.

Furthermore, in order to adjust a profile of the user terminal more precisely, a determination as to whether the user has been in a ready state of executing the non-triggered event is needed. Accordingly, the embodiments of the present disclosure further provide an exemplary method of determination. Before controlling the profile of the mobile terminal to be adjusted to the profile corresponding to the event type, the present disclosure further includes determining that the user is in a ready state of executing the non-triggered event. Through this solution, in response to determining that the user is in a state or a ready state of executing the non-triggered event, a profile of the terminal is adjusted to improve accuracy, and to avoid inconvenience that may be caused to the user when the user adjusts the profile of the terminal without executing the event.

In implementations, determining that the user is in the ready state of executing the non-triggered event includes determining a triggering position of the non-triggered event according to the message, locating a position of the user, and determining that the user is in the ready state of executing the non-triggered event if the position of the user matches the triggering position of the non-triggered event; or determining that the user has viewed the message or responded to the reminder for the non-triggered event before the triggering time.

Matching the position of the user with the triggering position of the non-triggered event may be understood as follows. When the non-triggered event is about participation in a departmental meeting and before a profile of the mobile terminal is controlled to be adjusted to a profile corresponding to the event type, the user is understood to be not in a ready state of executing the non-triggered event if the current position of the user is found to be far from the triggering position (i.e., the place where the departmental meeting is held) of the non-triggered event using a positioning function. If the current position of the user is near to the place where the departmental meeting is held, it may be understood that the user is in the ready state of executing the non-triggered event. In the embodiments of the present disclosure, position information of the user may be obtained through a Global Positioning System (GPS), WIFI, alibeacon, etc.

Another way of determining whether the user is in a ready state is to determine whether the user views the message or responds to the reminder for the non-triggered event before the triggering time. If the user views the message or responds to the reminder for the non-triggered event, it may be understood that the user has obtained related information of the non-triggered event. Under a normal circumstance, the user may be in a ready state of executing the non-triggered event.

It should be noted that the operation of adjusting the state of the mobile terminal for the non-triggered event may not be a compulsory adjustment in order to further improve the experience of the user. Before the state of the mobile terminal is adjusted, an adjustment prompt may be sent to the user. In implementations, before controlling the profile of the mobile terminal to be adjusted to the profile corresponding to the event type, the method further includes sending a prompt of adjustment of the profile to the user; and receiving an instruction that the user chooses to acknowledge the adjustment of the profile.

Figure 3A:
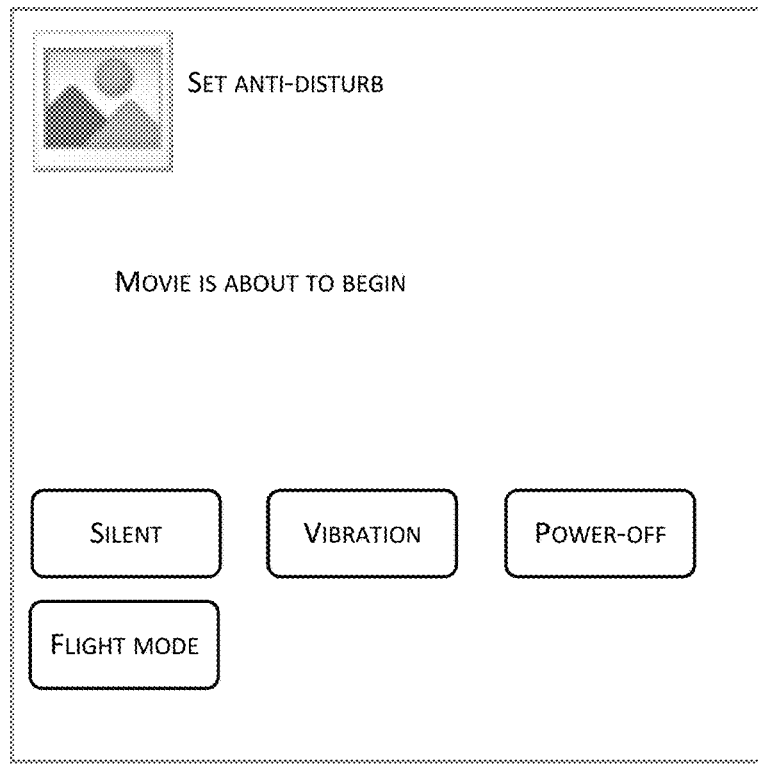
FIG. 3A is a schematic diagram of a prompt of adjusting a profile according to an embodiment of the present disclosure.
Figure 3B:
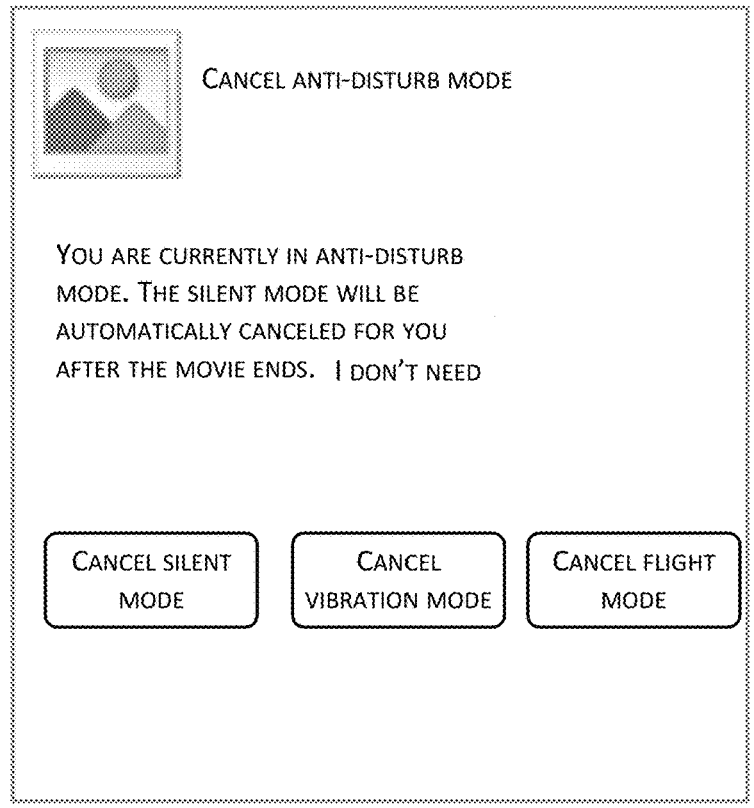
FIG. 3B is a schematic diagram of a prompt after a profile is adjusted according to an embodiment of the present disclosure.

For example, the prompt of adjustment of the profile that is sent to the user may be the one as shown in FIG. 3A. FIG. 3A is a schematic diagram of a prompt of adjustment of a profile according to an embodiment of the present disclosure. The specific scenario shown in FIG. 3A is an adjustment prompt of setting a profile as a profile of anti-disturb mode before a movie is about to begin. The anti-disturb mode may be understood as a combination of one or more of a silent, vibration or flight mode, and power-off. The type of the non-triggered event that needs to be set as the anti-disturb mode may be a movie event, a plane taking event, a meeting event, or the like. Besides being for a movie that is about to begin, a triggering condition of displaying a prompt of adjustment of a profile to a user may further specifically be prompts of various non-triggered events such as when a plane is about to take off, a meeting is about to begin and the like. A prompt of adjustment of a profile is displayed to a user in a form of a card in FIG. 3A. The card includes silent, vibration, power-off and flight modes. The user may send out an instruction by choosing to acknowledge the adjustment of the profile. For example, the user may adjust the current profile to a silent state by selecting silent, and adjust the current profile to a vibration state by selecting vibration in FIG. 3A. After the user chooses to acknowledge the adjustment of the profile to a silent, vibration or flight mode, the form of the card may be changed into a form as shown in FIG. 3B. FIG. 3B is a schematic diagram of a prompt after a profile is adjusted according to an embodiment of the present disclosure.

It should be further noted that, when the user does not agree to accept the adjustment, an instruction received from the user about choosing to acknowledge the adjustment of the profile may be to cancel the adjustment. In this case, the current profile of the mobile terminal may not be adjusted.

After the profile of the mobile terminal is adjusted according to the non-triggered event, under some circumstances, a request for restoring the current profile to the profile before the adjustment may exist. Accordingly, the embodiments of the present disclosure further provide a way of restoring a profile of a mobile terminal. In implementations, a profile of a mobile terminal is restored in response to detecting that an execution of a non-triggered event is completed. A number of ways of detecting that the execution of the non-triggered event is completed may exist. For example, a determination is made that the event is ended upon detecting that a user leaves an event site, or based on time information of the event.

It should be noted that the operation of restoring the profile of the mobile terminal may not be a compulsory adjustment in order to further improve the user experience. In implementations, before restoring the profile of the mobile terminal, the method further includes sending a prompt of restoring the profile to the user; and receiving an instruction that the user chooses to acknowledge restoring the profile.

Figure 3C:
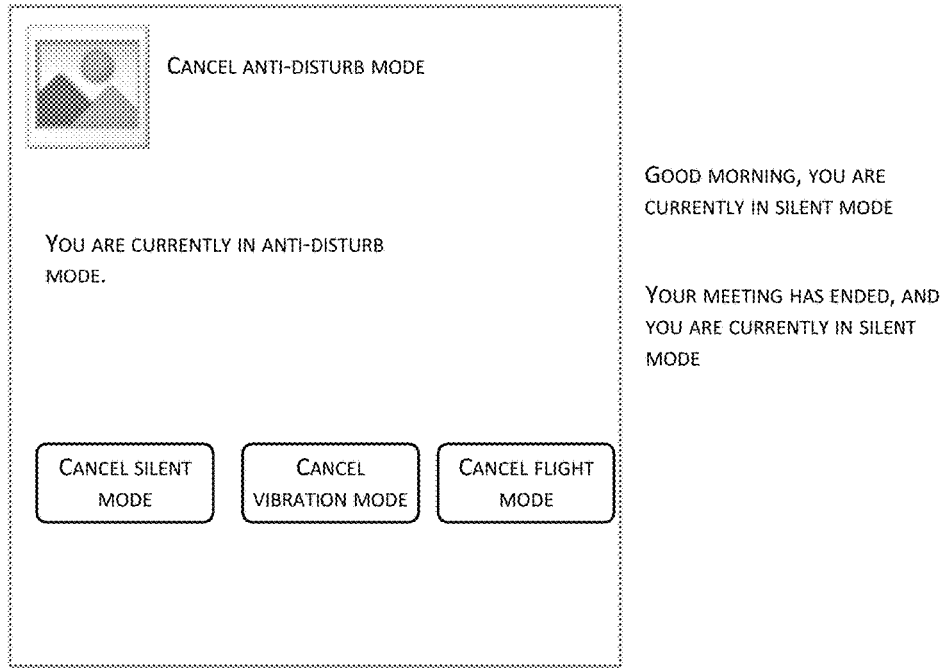
FIG. 3C is a schematic diagram of a prompt of restoring a profile according to an embodiment of the present disclosure.

For example, a prompt of restoring a profile that is sent to a user may be the one as shown in FIG. 3C. FIG. 3C is a schematic diagram of a prompt of restoring a profile according to an embodiment of the present disclosure. The specific scenario as shown in FIG. 3c is a prompt of restoring a profile that is sent to a user after a meeting is ended. As can be seen, the profile is adjusted to a silent, vibration or flight mode in the meeting. By receiving an instruction that the user chooses to acknowledge restoring the profile, the current profile may be restored to a profile before adjustment. If the user prefers the profile after the adjustment, the user may further choose retain the profile after the adjustment or directly change the profile of the mobile terminal to the profile after the adjustment.

As can be seen that, when a message including a non-triggered event is obtained, by analyzing the message to determine a triggering time and an event type of the non-triggered event, the user may also be helped to adjust the state of the mobile terminal to a state related to the event type, even if a user has read the information, so that the mobile terminal is in a state required by the user while the non-triggered event is executed, thus improving user experience.

Fourth Embodiment

Upon the basis of the second embodiment, the present embodiment further describes how to provide a prompt for a non-triggered event on a mobile terminal.

Figure 4:
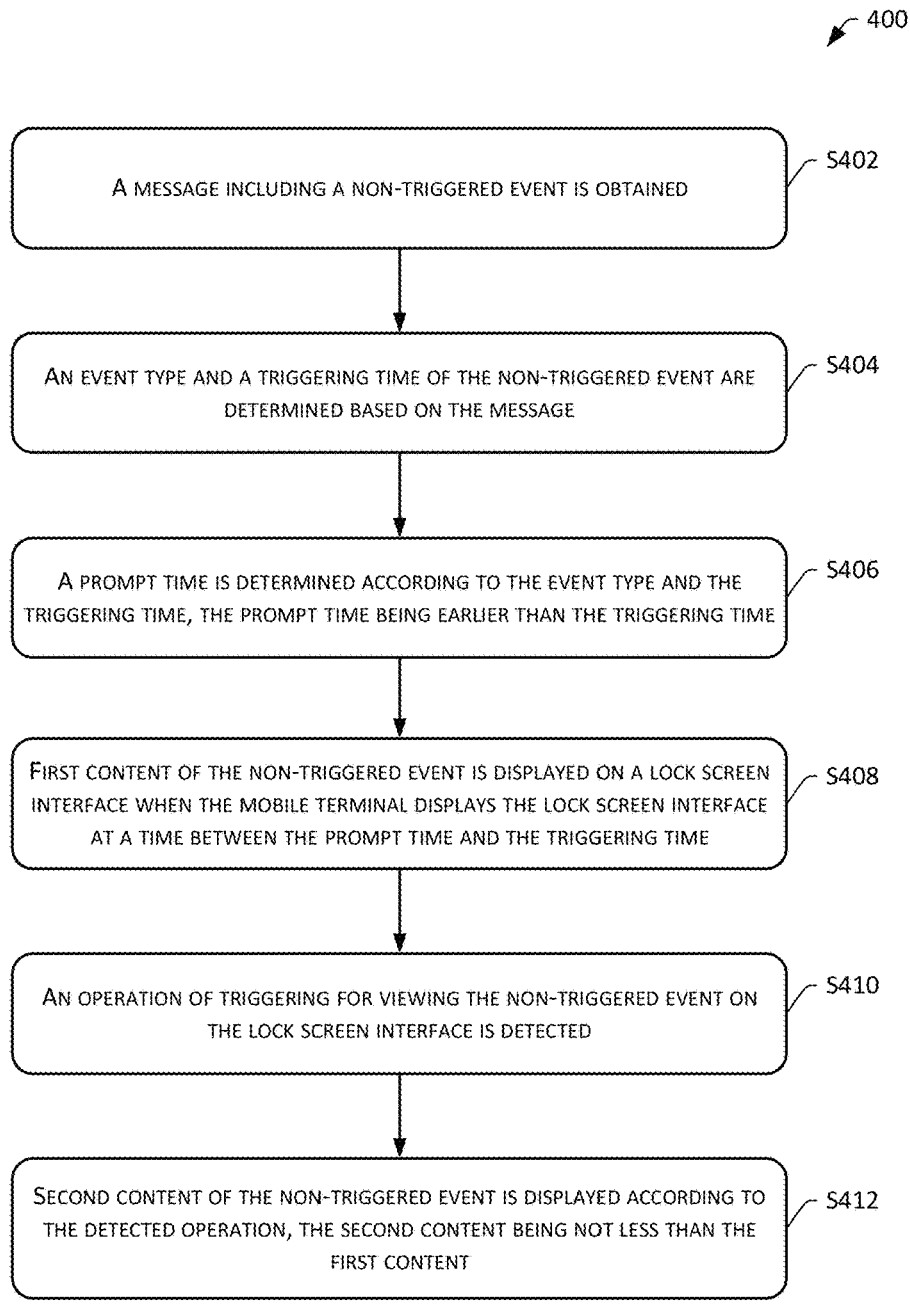
FIG. 4 is a flowchart of a data processing method according to an embodiment of the present disclosure.

A situation of providing a reminder for a non-triggered event according to an event type and a triggering time is shown in FIG. 4. FIG. 4 is a flowchart of a data processing method 400 according to an embodiment of the present disclosure. The method 400 may include the following operations.

S402: A message including a non-triggered event is obtained.

S404: An event type and a triggering time of the non-triggered event are determined according to the message.

S406: A prompt time is determined according to the event type and the triggering time, the prompt time being earlier than the triggering time.

S408: First content of the non-triggered event is displayed on a lock screen interface when the mobile terminal displays the lock screen interface at a time between the prompt time and the triggering time.

S410: An operation of triggering for viewing the non-triggered event on the lock screen interface is detected.

For example, the present disclosure does not limit a specific operational form of the operation. In implementations, the operation of triggering for viewing the non-triggered event includes an operation of clicking the first content; or an operation of sliding on the lock screen interface. The sliding operation may be understood as a sliding operation triggered on the lock screen interface. Furthermore, an unlocking method of some lock screen interfaces is to draw a predetermined graph through a sliding operation for unlocking. Hence, in order to effectively distinguish the sliding operation from a traditional unlocking operation, the embodiments of the present disclosure further provide an exemplary way of detecting the sliding operation. When the operation of triggering for viewing the non-triggered event is an operation of sliding on the lock screen interface, the sliding starts from a point in an area where the first content is located. Generally, the area of the first content may not overlap with an unlocking area in an unlocking interface, while the starting point of the sliding operation aimed at unlocking is generally in the unlocking area. Hence, by determining a position of the starting point of the sliding operation, the sliding operation starting from the area where the first content is located may be effectively distinguished from the sliding operation aimed at unlocking.

S412: Second content of the non-triggered event is displayed according to the detected operation, the second content being not less than the first content.

For example, the second content may be understood as occupying an area larger than that of the first content. The second content may be displayed on the unlocking area. As the operation of triggering for viewing the non-triggered event performed by the user may be understood as a request for hoping to further understand more information of the non-triggered event corresponding to the first content, the displayed second content is at least more than or equal to the first content. In implementations, displaying the second content of the non-triggered event includes obtaining the second content from feature data in the message related to the non-triggered event according to a display field included in a second style template, and displaying the second content according to a display style included in the second style template. The display style may be understood to include a layout formed by a combination of one or more of a display area, a background of display content, and a display field. If the displayed content includes a text, a font and a color of the text may be further included. If the displayed content includes a picture, a format, a size, an area and the like of the picture are included. If the displayed content includes animation, a format, a size, an area and the like of the animation are included. Through a display form of a picture and/or animation, a more intuitive prompt effect may be produced.

In implementations, when the operation of triggering for viewing the non-triggered event is the operation of sliding on the lock screen interface, displaying the second content of the non-triggered event includes determining a display area of the second content on the lock screen interface based on an end position of the sliding, and displaying the second content of the non-triggered event in the display area.

Figure 2B:
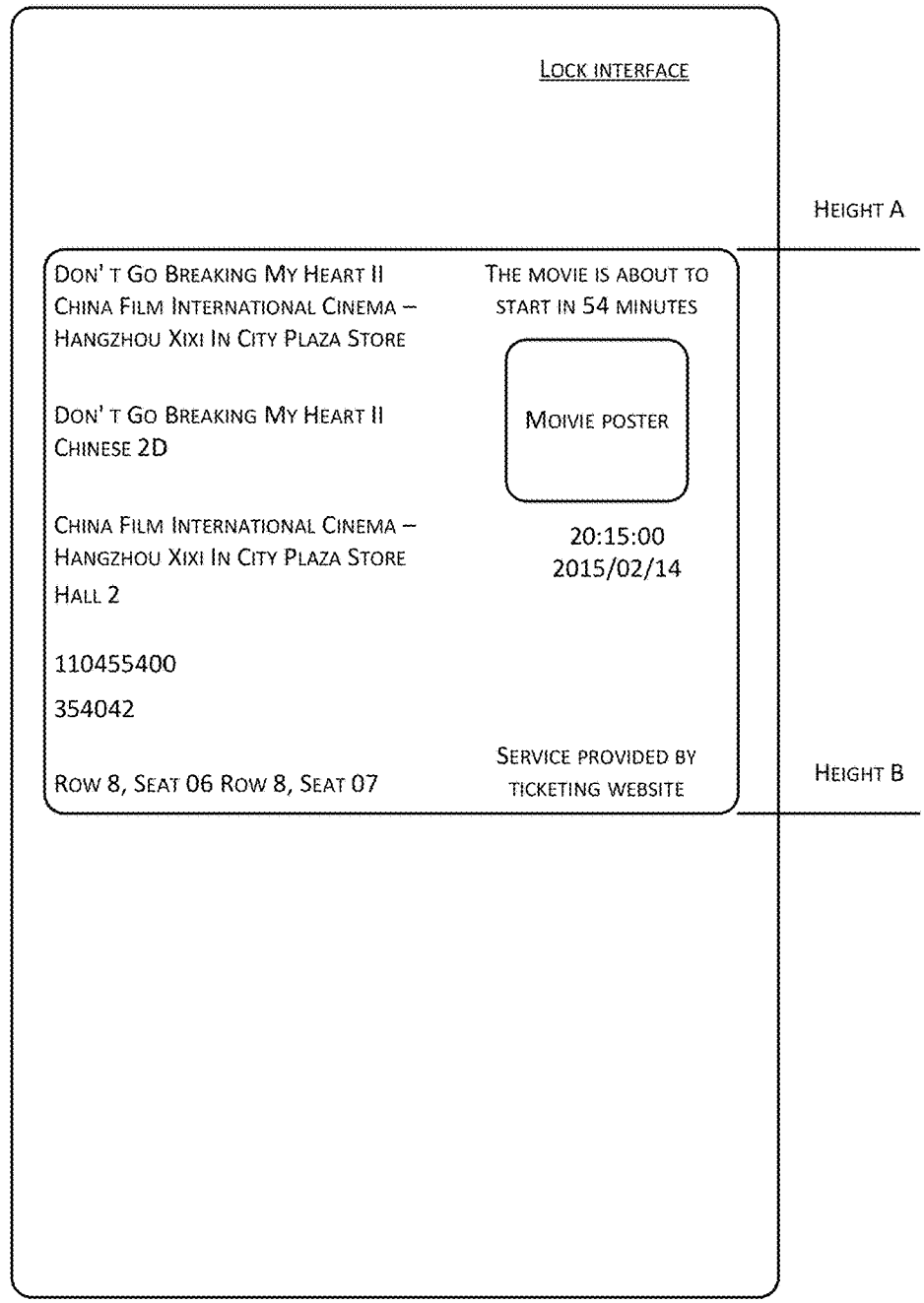
FIG. 2B is a schematic diagram of displaying second content on a lock screen interface according to an embodiment of the present disclosure.

For example, a display form of the second content may be referenced to FIG. 2B. FIG. 2B is a schematic diagram of displaying second content on a lock screen interface according to an embodiment of the present disclosure. The first content displayed in FIG. 2B is one of coupon forms, i.e., a large coupon. The height A may be understood as an end position of the sliding operation being on a point at the height A when the operation is the sliding operation. The height b may be understood as a preset height value. By using the height A and the height B, a display interval may be determined as an interval between the height A and the height B. It should be further noted that the present disclosure does not impose any limitation on the end position of the sliding operation, i.e., the height A needs to be relatively closer to the top of the mobile terminal than the height B.

It should be further noted that, when an end position of the sliding operation of the user reaches the top or bottom of a display screen of the mobile terminal, using the end position as the boundary of the display area may result in a poor display effect as the end position is too high or too low. In this case, a maximum height or a minimum height may be set. When the end position is higher than the maximum height or lower than the minimum height, the maximum height or minimum height is used as the boundary in the display area for displaying the second content.

Information of the non-triggered event may be displayed in detail in the second content. FIG. 2B is used as an example. In addition to displaying the movie name, the cinema name, and the time interval between the current time and the triggering time as displayed in the first content in FIG. 2A, the second content further displays a movie poster, a movie triggering time, e-coupon information of a movie ticket, information of the movie ticket, a ticket purchase website, and the like.

Figure 2C:
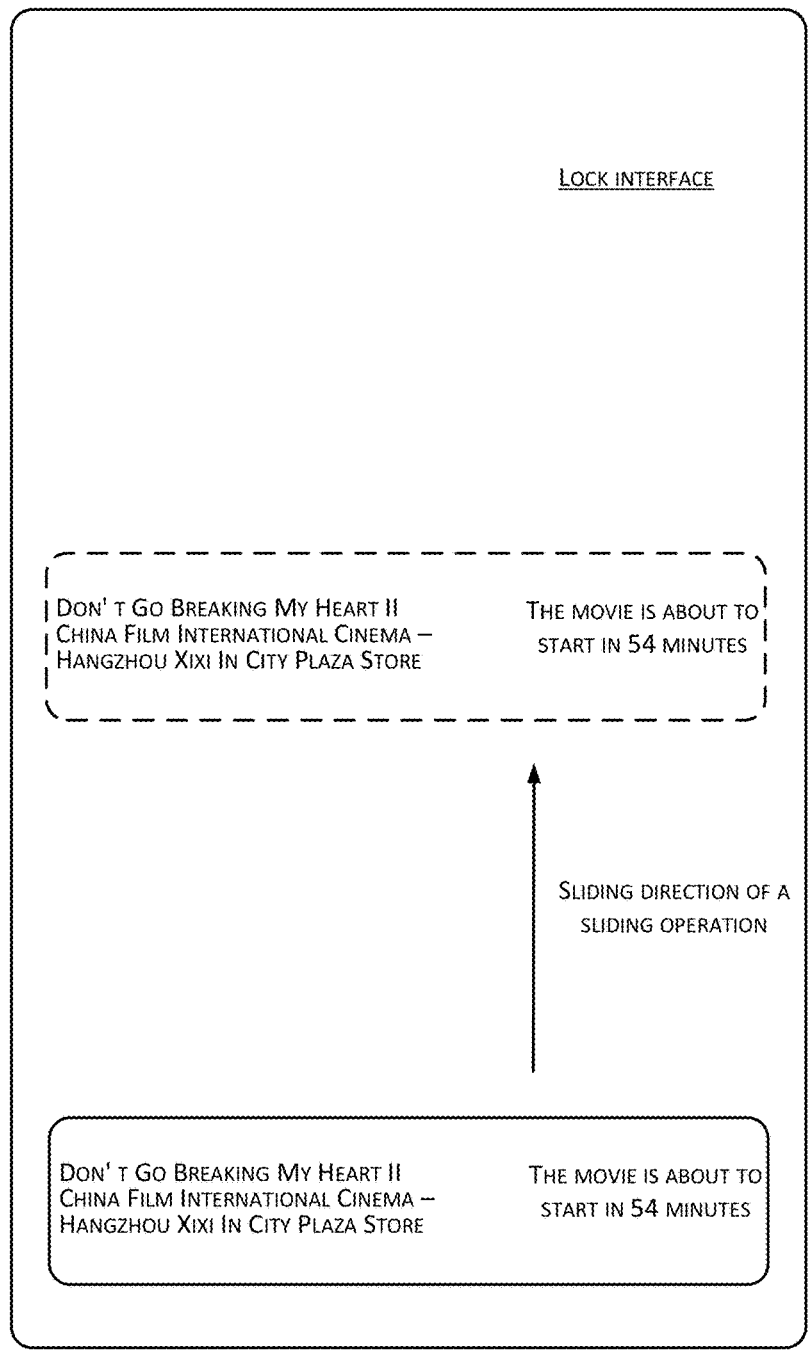
FIG. 2C is a schematic diagram of displaying first content on a lock screen interface according to an embodiment of the present disclosure.

In the process of sliding of the sliding operation, the first content or the small coupon originally displayed on the lock screen interface may move along with a sliding direction of the sliding operation. In implementations, the first content is generally located at the bottom of the lock screen interface. During the sliding operation, the first content may move towards the top of the lock screen interface along with the sliding operation. During the movement of the first content, the display effect of the first content on the lock screen interface may be a display effect of gradually fading away with the movement. The display effect may be as shown in FIG. 2C. FIG. 2C is a schematic diagram of displaying first content on a lock screen interface according to an embodiment of the present disclosure. When the sliding operation ends, the small coupon may appear at the end position and expand to form a large coupon. In order to clearly conduct a prompt, only one of the first content and the second content may be displayed on the lock screen interface. In other words, the first content is not displayed when the second content is displayed.

In implementations, the second style template corresponds to the event type of the non-triggered event, so that the form and style of the second content may change according to a different event type of the event, but is not limited to the form and style as shown in FIG. 2B.

In implementations, displaying the second content of the non-triggered event further includes establishing a second set display field and a hyperlink of a corresponding application included in the second content.

In implementations, an operation of selecting a display field of displayed content by a user is received.

If the selected display field has a hyperlink, an application corresponding to the selected display field is executed.

For example, when the second content is displayed through the second style template, a corresponding hyperlink for some specific fields included in the second content may be established, and a corresponding application may be executed when the hyperlink is selected. The second set display field may be a telephone number, a geographical position, a time, weather, or the like. For example, when the second set display field is a telephone number, a hyperlink to an application of making a phone may be displayed. When executing the hyperlink, the user may open the application of making a phone. When the second set display field is weather, a hyperlink to an application of weather forecast may be displayed. When executing the hyperlink, the user may open the application of weather forecast.

As can be seen from the embodiment, an operation of triggering for viewing a non-triggered event on a lock screen interface is generally implemented by a user actively. Therefore, it may be understood that first content has played a role of an effective prompt. Through the operation, the first content may be expanded into second content. Detailed information of the non-triggered event may be displayed in the second content, thus playing a role of further prompting the user in detail.

It should be understood that, in the embodiments of the present disclosure, in addition to the manner of displaying first content of a non-triggered event on a lock screen interface as described in the above embodiments, providing a reminder for the non-triggered event may also adopt another display manner, such as displaying in a notification bar of a user, or displaying on an interface currently operated by the user. In other words, the embodiments of the present disclosure do not impose any limitation on a display position of the first content of the non-triggered event, and the first content may be displayed in an operation scenario and interface of any terminal, to prompt the user, which is not detailed herein. Correspondingly, detecting an operation of triggering for viewing a non-triggered event may not be limited to operating and detecting first content displayed on a lock screen interface, and first content displayed on various interfaces may be performed. All subsequent processing and operations are also applied to situations that the first content is displayed on various interfaces.

Fifth Embodiment

Figure 5:
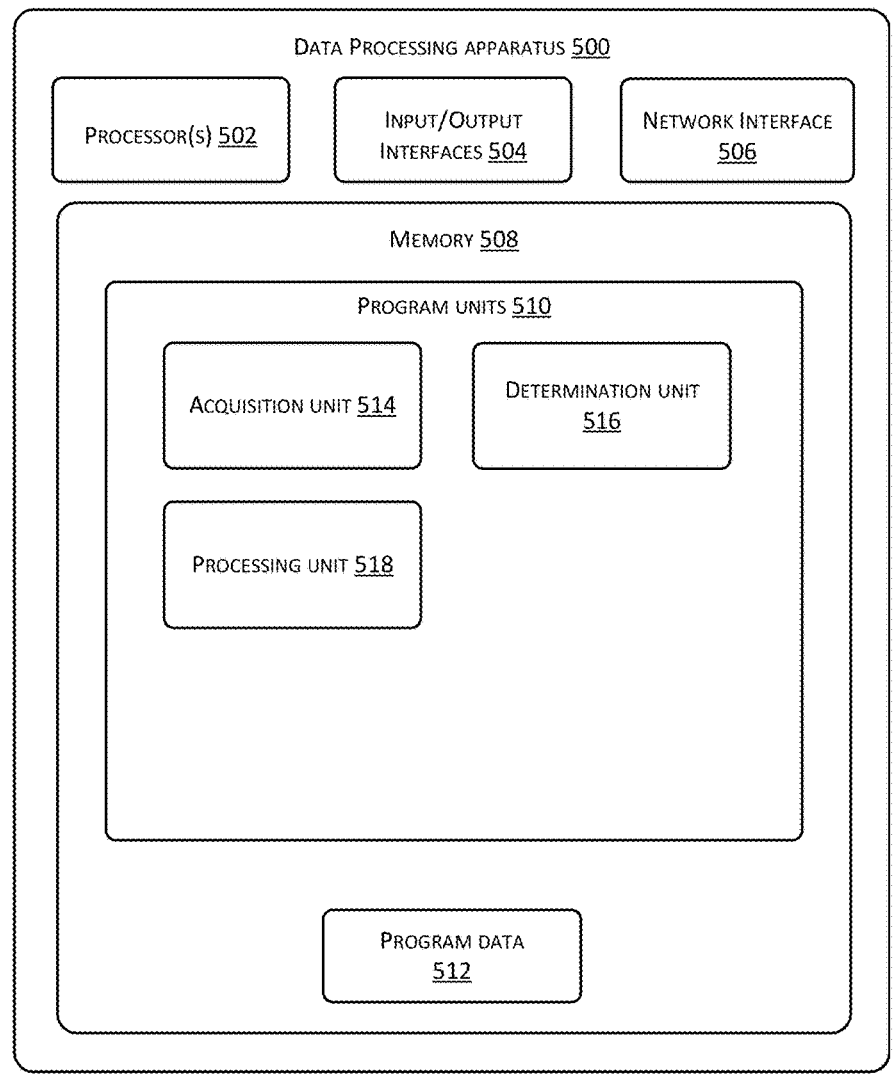
FIG. 5 is a structural diagram of a data processing apparatus according to an embodiment of the present disclosure.

FIG. 5 is a structural diagram of a data processing apparatus 500 according to an embodiment of the present disclosure, which is applicable to a mobile terminal. In implementations, the apparatus 500 may include a computing device, such as a mobile terminal, or may be a portion of a computing device. By way of example and not limitations, the apparatus 500 may include one or more processors 502, an input/output interface 504, a network interface 506, and memory 508.

The memory 508 may include a form of computer readable media such as a volatile memory, a random access memory (RAM) and/or a non-volatile memory, for example, a read-only memory (ROM) or a flash RAM. The memory 508 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 508 may include program units 510 and program data 512. The program units 510 may include an acquisition unit 514, a determination unit 516, and a processing unit 518.

The acquisition unit 514 configured to obtain a message including a non-triggered event.

For example, the non-triggered event may be understood as an event that has not yet taken place currently and is going to take place at a determined future time point, such as watching a movie B in a cinema A at nine o'clock tomorrow morning, taking a flight D at an airport C at five o'clock in the afternoon on the third day of next month, etc. The message may include the non-triggered event and related feature data.

The determination unit 516 configured to determine an event type and a triggering time of the non-triggered event according to the message.

For example, the non-triggered event has related feature data. The feature data may be understood as the time when the non-triggered event takes place, specific content of the non-triggered event, etc. For example, after a user purchases two movie tickets through www.wangpiao.com and pays for the tickets online, a mobile terminal of the user receives a message related to the online purchase of the movie tickets sent by www.wangpiao.com. A non-triggered event included in the message may be understood as watching a movie.

Event types in the embodiment of the present disclosure are not limited to watching a movie and taking a flight, and may further include ordering a meal, taking a train, etc.

The processing unit 518 configured to provide a reminder for the non-triggered event according to the event type and the triggering time, and/or control a state of the mobile terminal according to the event type and the triggering time.

For example, according to the technical solutions provided in the embodiment of the present application, the processing unit 518 may parse and analyze various kinds of short messages that are received, parse out a non-triggered event therefrom, and further process the non-triggered event. The processing includes, but is not limited to, providing a reminder for the non-triggered event in one aspect, and controlling a state of the mobile terminal according to the non-triggered event in another aspect. For the above two aspects of processing, one or both thereof may be selected for execution.

The processing unit 518 providing the reminder for the non-triggered event may include displaying prompt information on a lock screen interface, and may also include making a prompt through a sound, or the like. The processing unit 518 controlling the state of the mobile terminal may include setting a profile of the mobile terminal as a profile corresponding to the non-triggered event, and may also include setting the mobile terminal in a particular state, for example, an airplane mode or the like.

As can be seen, when a message including a non-triggered event is obtained, by analyzing the message to determine a triggering time and an event type of the non-triggered event, even if a user has read the information, a prompt may also be made for the non-triggered event before the triggering time through a manner of prompting corresponding to the event type, thus playing a role of further prompting the user of the non-triggered event. Alternatively, the user may also be helped to adjust a state of a mobile terminal to a state related to the event type, so that the mobile terminal is in a state required by the user during an execution of the non-triggered event, thus improving the user experience.

The above two aspects of processing are described respectively in detail through a sixth embodiment and a seventh embodiment hereinafter.

Sixth Embodiment

Based on top of the fifth embodiment, the present embodiment further describes the situation that the processing unit 518 provides a reminder for a non-triggered event according to an event type and a triggering time.

Figure 6:
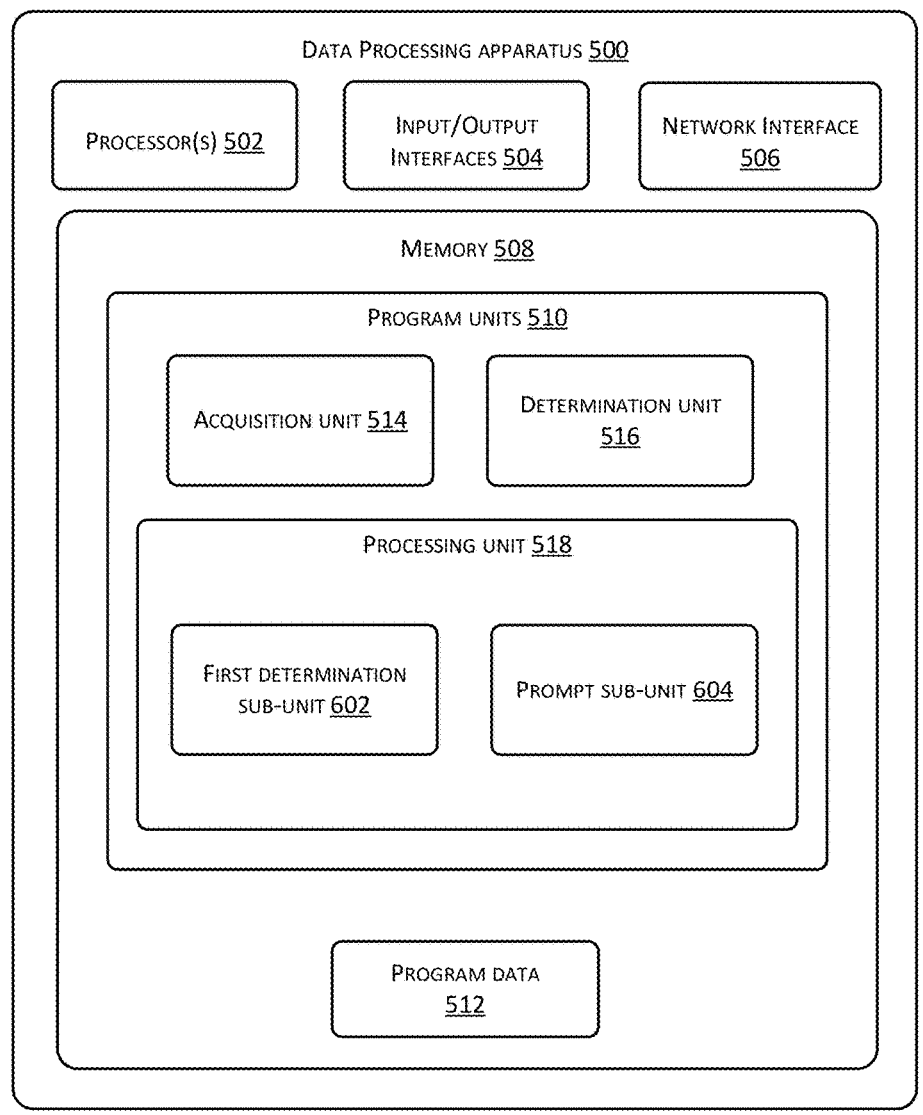
FIG. 6 is a structural diagram of a data processing apparatus according to an embodiment of the present disclosure.

FIG. 6 is a structural diagram of the data processing apparatus 500 in more detail. As described in the foregoing embodiments, the apparatus 500 may include the one or more processors 502, the input/output interface 504, the network interface 506, and the memory 508, which include program units 510 and program data 512. The program units 510 may include the acquisition unit 514, the determination unit 516, and the processing unit 518. In implementations, the processing unit 518 further includes a first determination sub-unit 602 and a prompt sub-unit 604.

The first determination sub-unit 602 configured to determine a prompt time according to the event type and the triggering time, the prompt time being earlier than the triggering time.

The prompt sub-unit 604 configured to display first content of the non-triggered event on a lock screen interface when the mobile terminal displays the lock screen interface, at a time between the prompt time and the triggering time.

For example, the prompt time may be understood as a time point which is at a preset time earlier than the triggering time. Different preset times may be assigned according to different event types. For example, for an event of a type of watching a movie, a preset time corresponding thereto doesn't necessarily have to be large, and may be set as 40 minutes, for example. If a triggering time for an event of watching a movie of which is 20:15 on Feb. 14, 2015, a prompt time so determined may be 19:35 on Feb. 14, 2015.

For an event of a type of taking a flight, a preset time corresponding thereto needs to be relatively large, which may be set as 4 hours. For example, for an event of a type of taking a flight of which a triggering time is 20:15 on Feb. 14, 2015, a prompt time so determined may be 16:15 on Feb. 14, 2015.

For example, in order to display the first content more clearly, the prompt sub-unit 604 may use a display field in a preset style template to display the first content. In implementations, the prompt sub-unit 604 displaying the first content of the non-triggered event includes obtaining the first content from feature data in the message related to the non-triggered event according to a display field included in a first style template, and displaying the first content according to a display style included in the first style template. The display style may be understood to include a layout formed by a combination of one or more of a display area, a background of display content, and a display field. If the displayed content includes a text, the style template may further include a font and a color of the text. If the displayed content includes a picture, the style template may further include a format, a size, an area, etc., of the picture. If the displayed content includes animation, the style template may further include a format, a size, an area and the like of the animation. Through a display form of a picture and/or animation, a more intuitive prompt effect may be produced.

When the prompt sub-unit 604 displays the first content through the first style template, the first content may be understood as a display region on the lock screen interface. A display form of the first content may be as shown in FIG. 2A. The first content displays a movie name, a cinema name, and a time interval between a current time and a triggering time.

In FIG. 2A, a position of the first content on the lock screen interface is only an exemplary position, and the embodiments of the present disclosure do not have any limitation on the specific position of the first content displayed on the lock screen interface.

In implementations, the first style template corresponds to the event type of the non-triggered event, so that the form and style of the first content may change according to a different event type of the event, but may not be limited to the form and style as shown in FIG. 2A.

In implementations, the display field included in the first style template includes at least a name field and a triggering time field of the non-triggered event. The first content may be all or some of the content in Table 1. Under normal circumstances, the first content may be a summary of the content corresponding to the event, and the first content may put emphasis on displaying key information of the non-triggered event, for example, the event name, the triggering time, and so on, to achieve an effect of making the clearest prompt in the smallest area.

In implementations, displaying the first content of the non-triggered event further includes establishing a first set display field and a hyperlink of a corresponding application included in the first content.

Figure 7:
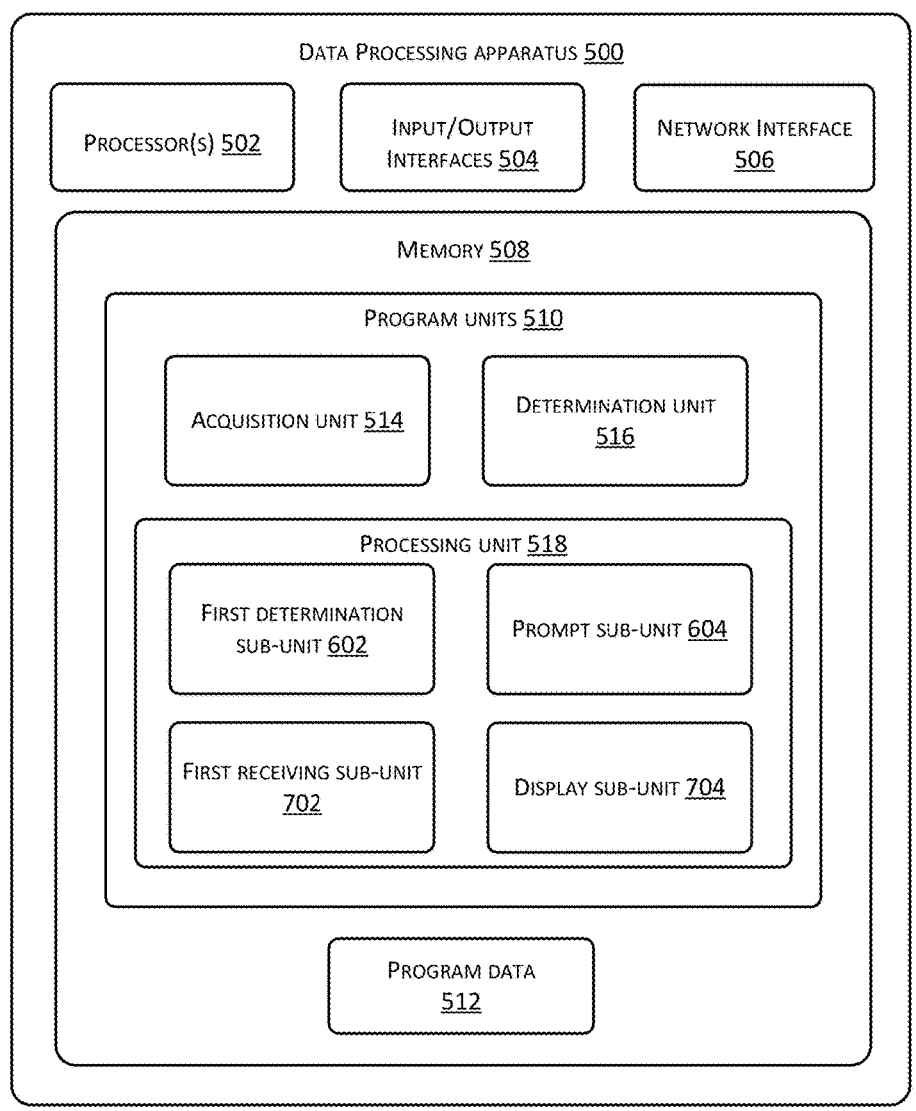
FIG. 7 is a structural diagram of a data processing apparatus according to an embodiment of the present disclosure.

FIG. 7 is a structural diagram of the data processing apparatus 500 in more detail. As described in the foregoing embodiments, the apparatus 500 may include the one or more processors 502, the input/output interface 504, the network interface 506, and the memory 508, which include program units 510 and program data 512. The program units 510 may include the acquisition unit 514, the determination unit 516, and the processing unit 518. In implementations, the processing unit 518 further includes a first receiving sub-unit 702 and a display sub-unit 704, on the basis of FIG. 6.

The first receiving sub-unit 702 is configured to receive an operation of selecting a display field of displayed content by a user.

The display sub-unit 704 is configured to execute an application corresponding to the selected display field if the selected display field has a hyperlink.

For example, when the prompt sub-unit 604 displays the first content through the first style template, a corresponding hyperlink may be further established for some specific fields included in the first content, and the display sub-unit 704 executes the corresponding application when the hyperlink is selected. The first set display field may be a telephone number, a geographical position, a time, weather, or the like. For example, when the first set display field is a telephone number, a hyperlink to an application of making a phone may be displayed. When executing the hyperlink, the user may open the application of making a phone. When the first set display field is weather, a hyperlink to an application of weather forecast may be displayed. When executing the hyperlink, the user may open the application of weather forecast.

It should be further noted that, when the prompt sub-unit 604 obtains multiple messages having different non-triggered events, a situation that a plurality of non-triggered events need to be prompted may occur at a time point if intervals between prompt times and triggering times of the multiple non-triggered events overlap with each other. Accordingly, in the embodiments of the present disclosure, the prompt sub-unit 604 may display a plurality of pieces of first content corresponding to a number of different non-triggered events respectively on the lock screen interface through a simultaneous display manner, or may also display, through a polling display manner, only a piece of first content or a number of pieces of first content corresponding to one or more of the non-triggered events each time when the lock screen interface is displayed. The present disclosure does not have any limitation on the display manner of the prompt sub-unit 604.

As can be seen, when a message including a non-triggered event is obtained, by analyzing the message to determine a triggering time and an event type of the non-triggered event, a prompt may also be made for the non-triggered event before the triggering time through a manner of prompting corresponding to the event type, even if a user has read the information, thus playing a role of further prompting the user the non-triggered event.

Seventh Embodiment

Based on the fifth Embodiment, the present embodiment further describes the situation that the processing unit 518 controls the state of the mobile terminal according to the event type and the triggering time.

Figure 8:
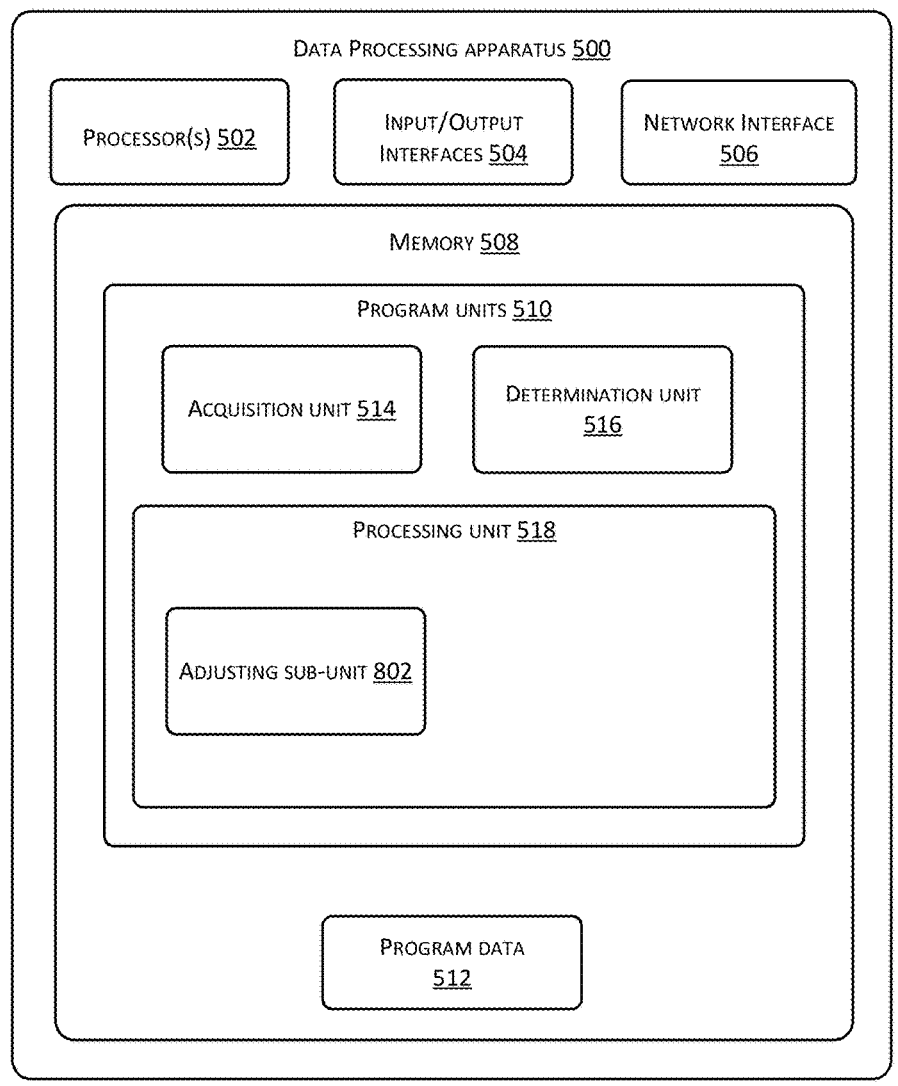
FIG. 8 is a structural diagram of a data processing apparatus according to an embodiment of the present disclosure.

FIG. 8 is a structural diagram of the data processing apparatus 500 in more detail. As described in the foregoing embodiments, the apparatus 500 may include the one or more processors 502, the input/output interface 504, the network interface 506, and the memory 508, which include program units 510 and program data 512. The program units 510 may include the acquisition unit 514, the determination unit 516, and the processing unit 518. In implementations, the processing unit 518 further includes an adjusting sub-unit 802, on the basis of FIG. 5.

The adjusting sub-unit 802 is configured to control a profile of the mobile terminal to be adjusted to a profile corresponding to the event type at a set time when or before the triggering time is reached.

For example, the profile may be understood as a profile currently supported by the mobile terminal, for example, a flight mode, a silent mode, a vibration mode, a ringing mode, or the like, and may also be understood as a profile customized according to requirements of the embodiment of the present disclosure. The customization may be selected and defined by a user, for example, a hybrid mode of vibration and ringing, a mode of refusing to answer a call but receiving data information, or the like. For different event types, different profiles may exist correspondingly. Furthermore, different customized profiles may exist for a same event type, for example. For example, a non-triggered event is specifically holding a departmental meeting from three o'clock to five o'clock in the afternoon on Feb. 13, 2015, and a corresponding event type may be a meeting event. A profile corresponding to the meeting event may be a silent mode. From three o'clock in the afternoon of that day on which the departmental meeting is held, a current profile of the mobile terminal is adjusted to a corresponding silent mode. Thus, when the departmental meeting is held, the mobile terminal may not affect the discipline of the meeting due to creating noises by receiving a call, a text message, and so on.

Figure 9:
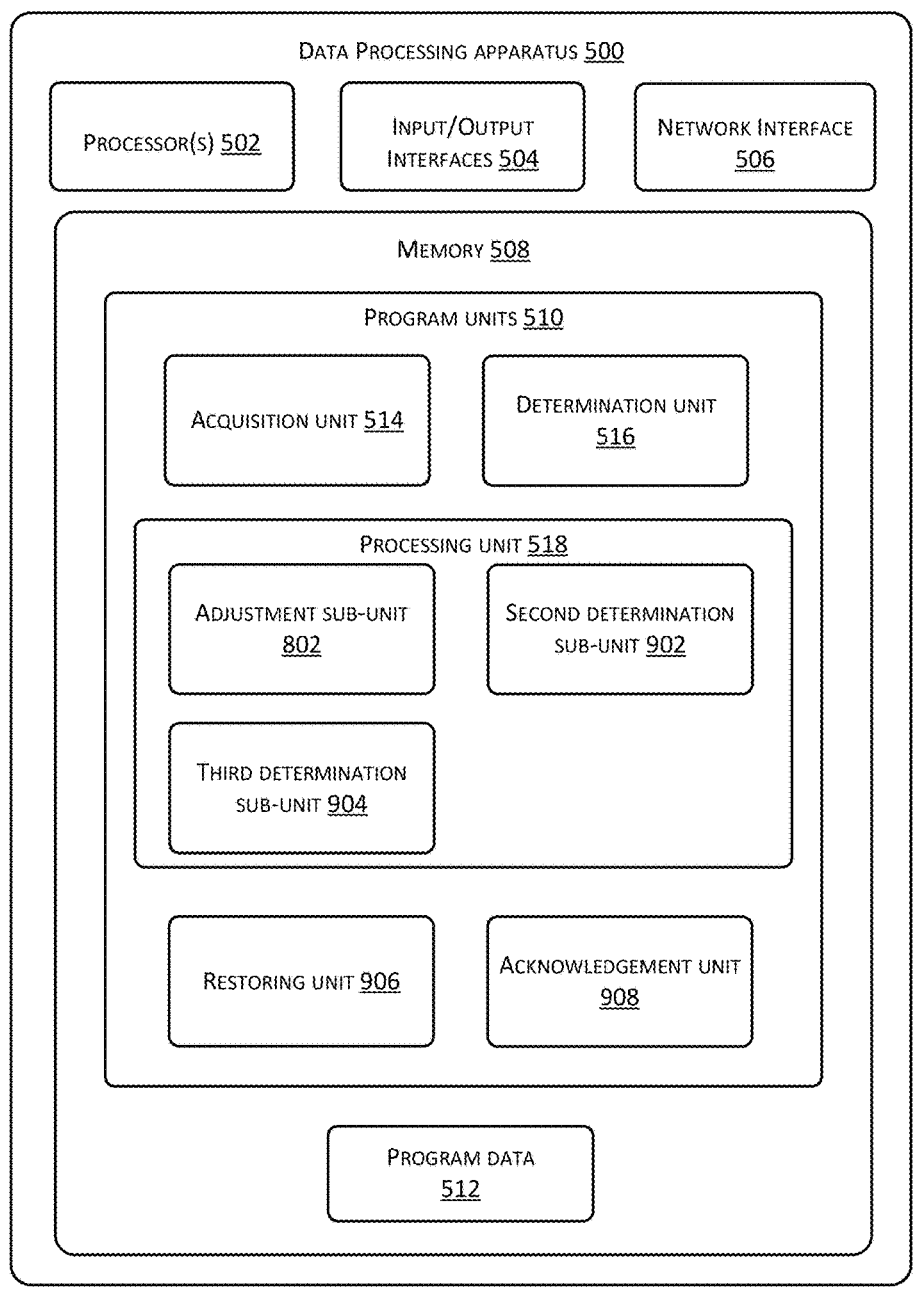
FIG. 9 is a structural diagram of a data processing apparatus according to an embodiment of the present disclosure.

In order to prompt the user more precisely, a determination as to whether the user has been in a ready state of executing the non-triggered event is further needed. Accordingly, the processing unit 518 further includes a second determination sub-unit 902, on the basis of FIG. 8. FIG. 9 is a structural diagram of the data processing apparatus 900 in more detail.

The second determination sub-unit 902 is configured to determine that the user is in a ready state of executing the non-triggered event before the adjusting sub-unit is triggered.

In implementations, the second determination sub-unit 902 is specifically configured to determine a triggering position of the non-triggered event according to the message, locate a position of the user, and determine that the user is in the ready state of executing the non-triggered event if the position of the user matches the triggering position of the non-triggered event. Alternatively, the second determination sub-unit 902 is specifically configured to determine that the user has viewed the message or has responded to the reminder of the non-triggered event before the triggering time.

Matching the position of the user with the triggering position of the non-triggered event may be understood as follows. When the non-triggered event is about participation in a departmental meeting and before a profile of the mobile terminal is controlled to be adjusted to a profile corresponding to the event type, the user is understood to be not in a ready state of executing the non-triggered event if the current position of the user is found to be far from the triggering position (i.e., the place where the departmental meeting is held) of the non-triggered event using a positioning function. If the current position of the user is near to the place where the departmental meeting is held, it may be understood that the user is in the ready state of executing the non-triggered event. In the embodiments of the present disclosure, position information of the user may be obtained through a Global Positioning System (GPS), WIFI, alibeacon, etc.

Another way of determining whether the user is in a ready state is to determine whether the user views the message or responds to the reminder for the non-triggered event before the triggering time. If the user views the message or responds to the reminder for the non-triggered event, it may be understood that the user has obtained related information of the non-triggered event. Under a normal circumstance, the user may be in a ready state of executing the non-triggered event.

It should be noted that the operation of adjusting the state of the mobile terminal for the non-triggered event may not be a compulsory adjustment in order to further improve the experience of the user. Before the state of the mobile terminal is adjusted, an adjustment prompt may be sent to the user. In implementations, the processing unit 518 further includes a third acknowledgement sub-unit 904, on the basis of FIG. 9.

A third acknowledgement sub-unit 904 configured to send a prompt of adjustment of the profile to the user, and receive an instruction that the user chooses to acknowledge the adjustment of the profile.

For example, the prompt of adjustment of the profile that is sent by the third acknowledgement sub-unit 904 to the user may be the one as shown in FIG. 3A. When the user chooses to acknowledge the adjustment of the profile as a silent, vibration or flight mode, the form of the card may be changed into the form as shown in FIG. 3B.

It should be further noted that, when the user does not agree to accept the adjustment, an instruction received from the user about choosing to acknowledge the adjustment of the profile may be to cancel the adjustment. In this case, the current profile of the mobile terminal may not be adjusted.

After the profile of the mobile terminal is adjusted according to the non-triggered event, under some circumstances, a request for restoring the current profile to the profile before the adjustment may exist.

In implementations, on the basis of FIG. 9, the apparatus further includes a restoring unit 906 configured to restore the profile of the mobile terminal in response to detecting that an execution of the non-triggered event is completed.

It should be noted that the operation of restoring the profile of the mobile terminal may not be a compulsory adjustment in order to further improve the user experience.

In implementations, on the basis of FIG. 9, the apparatus further includes an acknowledgement unit 908 configured to send a prompt of restoring the profile to the user before the restoring unit is triggered, and receive an instruction that the user chooses to acknowledge restoring the profile.

For example, a prompt of restoring a profile that is sent to a user may be the one as shown in FIG. 3C. By receiving an instruction that the user chooses to acknowledge restoring the profile, the current profile may be restored to a profile before adjustment. If the user prefers the profile after the adjustment, the user may further choose keep the profile after the adjustment or directly change the profile of the mobile terminal to the profile after the adjustment.

As can be seen that, when a message including a non-triggered event is obtained, by analyzing the message to determine a triggering time and an event type of the non-triggered event, the user may also be helped to adjust the state of the mobile terminal to a state related to the event type, even if a user has read the information, so that the mobile terminal is in a state required by the user while the non-triggered event is executed, thus improving user experience.

Eighth Embodiment

On the basis of the sixth embodiment, the present embodiment further describes how the processing unit 518 provides the prompt of the non-triggered event on the mobile terminal.

Figure 10:
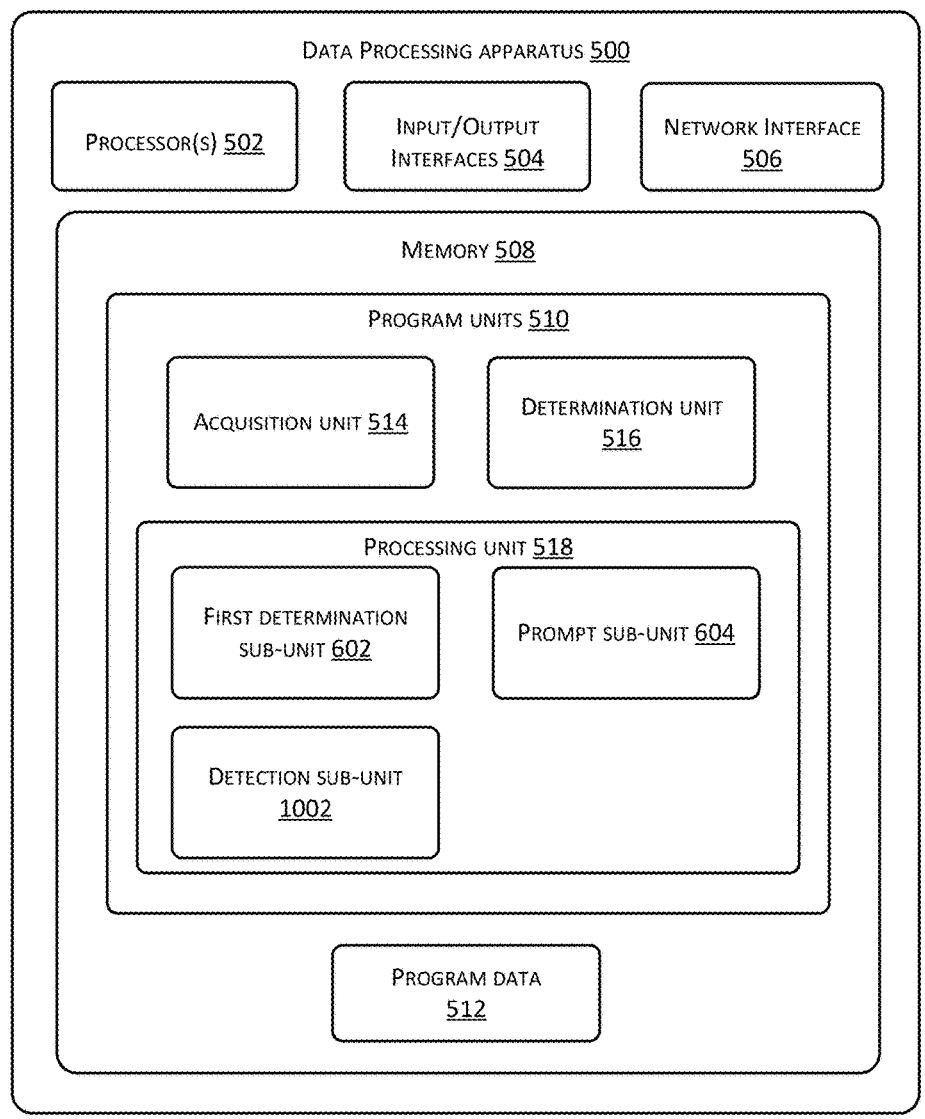
FIG. 10 is a structural diagram of a data processing apparatus according to an embodiment of the present disclosure.

On the basis of FIG. 6, the processing unit 518 further includes a detection sub-unit 1002. FIG. 10 is a structural diagram of the data processing apparatus 500 according to an embodiment of the present disclosure in more detail.

The detection sub-unit 1002 is configured to detect an operation of triggering for viewing the non-triggered event on the lock screen interface after the prompt sub-unit is triggered.

For example, the present disclosure does not have any limitation on a specific operational form of the operation. In implementations, the operation of triggering for viewing the non-triggered event includes an operation of clicking the first content; or an operation of sliding on the lock screen interface. The sliding operation may be understood as a sliding operation triggered on the lock screen interface. Furthermore, an unlocking method of some lock screen interfaces is to draw a predetermined graph through a sliding operation for unlocking. Hence, in order to effectively distinguish the sliding operation from a traditional unlocking operation, the embodiments of the present disclosure further provide an exemplary way of detecting the sliding operation. When the operation of triggering for viewing the non-triggered event is an operation of sliding on the lock screen interface, the sliding starts from a point in an area where the first content is located. Generally, the area of the first content may not overlap with an unlocking area in an unlocking interface, while the starting point of the sliding operation aimed at unlocking is generally in the unlocking area. Hence, by determining a position of the starting point of the sliding operation, the sliding operation starting from the area where the first content is located may be effectively distinguished from the sliding operation aimed at unlocking.

The prompt sub-unit 604 is further configured to display second content of the non-triggered event according to the detected operation, the second content being not less than the first content.

For example, the second content may be understood as occupying an area larger than that of the first content. The second content may be displayed on the unlocking area. As the operation of triggering for viewing the non-triggered event performed by the user may be understood as a request for hoping to further understand more information of the non-triggered event corresponding to the first content, the second content displayed by the prompt sub-unit 604 is at least more than or equal to the first content. In implementations, the prompt sub-unit 604 displaying the second content of the non-triggered event specifically includes obtaining the second content from feature data in the message related to the non-triggered event according to a display field included in a second style template, and displaying the second content according to a display style included in the second style template. The display style may be understood to include a layout formed by a combination of one or more of a display area, a background of display content, and a display field. If the displayed content includes a text, a font and a color of the text may be further included. If the displayed content includes a picture, a format, a size, an area and the like of the picture are included. If the displayed content includes animation, a format, a size, an area and the like of the animation are included. Through a display form of a picture and/or animation, a more intuitive prompt effect may be produced.

In implementations, when the operation of triggering for viewing the non-triggered event is the operation of sliding on the lock screen interface, the second content of the non-triggered event is displayed, and the prompt sub-unit 604 is specifically configured to determine a display area of the second content on the lock screen interface according to an end position of the sliding, and display the second content of the non-triggered event in the display area.

For example, a display form of the second content may be referenced to FIG. 2B.

It should be further noted that, when an end position of the sliding operation of the user reaches the top or bottom of a display screen of the mobile terminal, using the end position as the boundary of the display area may result in a poor display effect as the end position is too high or too low. In this case, a maximum height or a minimum height may be set. When the end position is higher than the maximum height or lower than the minimum height, the maximum height or minimum height is used as the boundary in the display area for displaying the second content.

Information of the non-triggered event may be displayed in detail in the second content. FIG. 2B is used as an example. In addition to displaying the movie name, the cinema name, and the time interval between the current time and the triggering time as displayed in the first content in FIG. 2A, the second content further displays a movie poster, a movie triggering time, e-coupon information of a movie ticket, information of the movie ticket, a ticket purchase website, and the like.

In the process of sliding of the sliding operation, the first content or the small coupon originally displayed on the lock screen interface may move along with a sliding direction of the sliding operation. In implementations, the first content is generally located at the bottom of the lock screen interface. During the sliding operation, the first content may move towards the top of the lock screen interface along with the sliding operation. During the movement of the first content, the display effect of the first content on the lock screen interface may be a display effect of gradually fading away with the movement. The display effect may be as shown in FIG. 2C. When the sliding operation ends, the small coupon may appear at the end position and expand to form a large coupon. In order to clearly conduct a prompt, only one of the first content and the second content may be displayed on the lock screen interface. In other words, the first content is not displayed when the second content is displayed.

In implementations, the second style template corresponds to the event type of the non-triggered event, so that the form and style of the second content may change according to a different event type of the event, but is not limited to the form and style as shown in FIG. 2B.

In implementations, the prompt sub-unit 604 displaying the second content of the non-triggered event further specifically includes establishing a second set display field and a hyperlink of a corresponding application included in the second content.

In implementations, the first receiving sub-unit 702 is further configured to receive an operation of selecting a display field of displayed content by a user.

The display sub-unit 704 is further configured to execute an application corresponding to the selected display field if the selected display field has a hyperlink.

For example, when the second content is displayed through the second style template, a corresponding hyperlink for some specific fields included in the second content may be established, and a corresponding application may be executed when the hyperlink is selected. The second set display field may be a telephone number, a geographical position, a time, weather, or the like. For example, when the second set display field is a telephone number, a hyperlink to an application of making a phone may be displayed. When executing the hyperlink, the user may open the application of making a phone. When the second set display field is weather, a hyperlink to an application of weather forecast may be displayed. When executing the hyperlink, the user may open the application of weather forecast.

As can be seen from the embodiment, an operation of triggering for viewing a non-triggered event on a lock screen interface is generally implemented by a user actively. Therefore, it may be understood that first content has played a role of an effective prompt. Through the operation, the first content may be expanded into second content. Detailed information of the non-triggered event may be displayed in the second content, thus playing a role of further prompting the user in detail.

Through the above description of the implementations, one skilled in the art can clearly understand that all or some of the steps in the methods of the foregoing embodiments may be accomplished through software plus a universal hardware platform. Base on this understanding, the nature of the technical solutions of the present disclosure or the parts that make contributions to the existing technologies may be embodied in a form of a software product. The computer software product may be stored in a storage media, for example, a ROM/RAM, a magnetic disc, an optical disk or the like, and includes instructions adapted to instruct a computing device (which may be a personal computer, a server, or a network communication device such as a media gateway) to perform the method according to the embodiments or certain parts of the embodiments of the present disclosure.

It should be noted that the embodiments in this specification are all described in a progressive manner. Identical or similar parts between the embodiments may be obtained by referencing one another. Each embodiment puts emphasis differently from other embodiments. In particular, as device and system embodiments are basically similar to the method embodiments, the description thereof is relatively simple. For related parts, reference may be made to the description of the parts in the method embodiments. The device and system embodiments described above are merely schematic. The units described as separate components may or may not be physically separate from each other. Components displayed as units may or may not be physical units, may be located in a single location, or may be distributed among a plurality of network units. Some or all of the modules therein may be selected according to actual needs to achieve the objectives of the solutions of the embodiments. One of ordinary skill in the art can understand and implement the solutions without making any creative effort.

The above descriptions are merely exemplary implementations of the present disclosure, but are not intended to limit the scope of protection of the present disclosure. It should be noted that one of ordinary skill in the art can further make improvements and modifications without departing from the principles of the present disclosure. These improvements and modifications should also be included in the scope of protection of the present disclosure.

What is claimed is:

1. A method implemented by a computing device, the method comprising:
    obtaining a message comprising a non-triggered event;
    determining an event type and a triggering time of the non-triggered event according to the message;
    providing a reminder for the non-triggered event according to the event type and the triggering time; and
    controlling a state of the computing device according to the event type and the triggering time, the controlling comprises controlling a profile of the computing device to be adjusted to a profile corresponding to the event type at a set time when or before the triggering time is reached, wherein a prompt of adjustment of the profile of the computing device is sent to a user, and an instruction that the user chooses to acknowledge the adjustment of the profile of the computing device is received, before controlling the profile of the computing device to be adjusted to the profile corresponding to the event type.

2. The method of claim 1, wherein providing the reminder for the non-triggered event comprises:
    determining a prompt time according to the event type and the triggering time, the prompt time being earlier than the triggering time; and
    displaying first content of the non-triggered event on a lock screen interface at a time between the prompt time and the triggering time, when the computing device displays the lock screen interface.

3. The method of claim 2, further comprising:
    detecting an operation of triggering for viewing the non-triggered event on the lock screen interface after displaying the first content of the non-triggered event on the lock screen interface; and
    displaying second content of the non-triggered event according to the detected operation, the second content being not less than the first content.

4. The method of claim 3, wherein the operation of triggering for viewing the non-triggered event comprises:
    an operation of clicking the first content; or
    an operation of sliding on the lock screen interface.

5. The method of claim 4, wherein the operation of triggering for viewing the non-triggered event is the operation of sliding on the lock screen interface, and the sliding starts at a point in an area where the first content is located.

6. The method of claim 4, wherein the operation of triggering for viewing the non-triggered event is the operation of sliding on the lock screen interface, and displaying the second content of the non-triggered event comprises:
    determining a display area of the second content on the lock screen interface according to an end position of the sliding; and
    displaying the second content of the non-triggered event in the display area.

7. The method of claim 3, wherein:
    displaying the first content of the non-triggered event comprises: obtaining the first content from feature data in the message related to the non-triggered event according to a first display field included in a first style template, and displaying the first content according to a first display style included in the first style template; and displaying the second content of the non-triggered event comprises: obtaining the second content from the feature data in the message related to the non-triggered event according to a second display field included in a second style template, and displaying the second content according to a second display style included in the second style template.

8. The method of claim 7, wherein:
displaying the first content of the non-triggered event further comprises establishing a first set display field and a hyperlink of a corresponding application included in the first content; and/or
displaying the second content of the non-triggered event further comprises establishing a second set display field and the hyperlink of the corresponding application included in the second content.

9. The method of claim 8, further comprising:
receiving an operation of selecting a display field of displayed content by a user; and
executing a respective application corresponding to the selected display field if the selected display field has a hyperlink.

10. The method of claim 1, further comprising determining that the user is in a ready state of executing the non-triggered event before controlling the profile of the computing device to be adjusted to the profile corresponding to the event type.

11. The method of claim 10, wherein determining that the user is in the ready state of executing the non-triggered event comprises:
determining a triggering position of the non-triggered event according to the message, locating a position of the user, and determining that the user is in the ready state of executing the non-triggered event if the position of the user matches the triggering position of the non-triggered event; or
determining that the user views the message or responds to the reminder for the non-triggered event before the triggering time.

12. The method of claim 1, further comprising restoring the profile of the computing device in response to detecting that an execution of the non-triggered event is completed.

13. A computing device comprising:
one or more processors;
memory;
an acquisition unit stored in the memory and executable by the one or more processors to obtain a message comprising a non-triggered event;
a determination unit stored in the memory and executable by the one or more processors to determine an event type and a triggering time of the non-triggered event according to the message; and
a processing unit stored in the memory and executable by the one or more processors to:
provide a reminder for the non-triggered event according to the event type and the triggering time,
determine a triggering position of the non-triggered event according to the message,
locate a position of the user,
determine that a user is in a ready state of executing the non-triggered event if the position of the user matches the triggering position of the non-triggered event, and
control a profile of the computing device to be adjusted to a profile corresponding to the event type at a set time when or before the triggering time is reached.

14. The computing device of claim 13, wherein the processing unit comprises:
a first determination sub-unit configured to determine a prompt time according to the event type and the triggering time, the prompt time being earlier than the triggering time; and
a prompt sub-unit configured to display a first content of the non-triggered event on a lock screen interface at a time between the prompt time and the triggering time, when the computing device displays the lock screen interface.

15. The computing device of claim 14, wherein the processing unit further comprises a detection sub-unit configured to detect an operation of triggering for viewing the non-triggered event on the lock screen interface after the prompt sub-unit is triggered, wherein the prompt sub-unit is further configured to display second content of the non-triggered event according to the detected operation, the second content being not less than the first content.

16. One or more computer-readable media storing executable instructions that, when executed by one or more processors of a computing device, cause the one or more processors to perform acts comprising:
obtaining a message comprising a non-triggered event;
determining an event type and a triggering time of the non-triggered event according to the message;
providing a reminder for the non-triggered event according to the event type and the triggering time;
determining a triggering position of the non-triggered event according to the message;
locating a position of the user;
determining that a user is in a ready state of executing the non-triggered event if the position of the user matches the triggering position of the non-triggered event; and
controlling a profile of the computing device to be adjusted to a profile corresponding to the event type at a set time when or before the triggering time is reached.

17. The one or more computer-readable media of claim 16, wherein the acts further comprise:
determining a prompt time according to the event type and the triggering time, the prompt time being earlier than the triggering time; and
displaying a first content of the non-triggered event on a lock screen interface at a time between the prompt time and the triggering time, when the computing device displays the lock screen interface.

18. The one or more computer-readable media of claim 17, wherein the acts further comprise:
detecting an operation of triggering for viewing the non-triggered event on the lock screen interface after the prompt sub-unit is triggered; and
displaying second content of the non-triggered event according to the detected operation, the second content being not less than the first content.

19. The one or more computer-readable media of claim 18, wherein the operation of triggering for viewing the non-triggered event comprises:
an operation of clicking the first content; or
an operation of sliding on the lock screen interface.

20. The one or more computer-readable media of claim 19, wherein the operation of triggering for viewing the non-triggered event is the operation of sliding on the lock screen interface, and the sliding starts at a point in an area where the first content is located.

* * * * *